United States Patent
Hoeting et al.

(10) Patent No.: US 11,536,403 B2
(45) Date of Patent: Dec. 27, 2022

(54) FLUID UNION APPARATUS AND METHOD

(71) Applicant: Setco Sales Company, Cincinnati, OH (US)

(72) Inventors: Stephen Charles Hoeting, Maineville, OH (US); Justin Anthony White, Milford, OH (US)

(73) Assignee: Setco Sales Company, Cincinnati, OH (US)

( * ) Notice: Subject to any disclaimer, the term of this patent is extended or adjusted under 35 U.S.C. 154(b) by 844 days.

(21) Appl. No.: 16/472,005

(22) PCT Filed: Dec. 15, 2017

(86) PCT No.: PCT/US2017/066629
§ 371 (c)(1),
(2) Date: Jun. 20, 2019

(87) PCT Pub. No.: WO2018/118678
PCT Pub. Date: Jun. 28, 2018

(65) Prior Publication Data
US 2019/0353288 A1    Nov. 21, 2019

Related U.S. Application Data

(60) Provisional application No. 62/437,893, filed on Dec. 22, 2016.

(51) Int. Cl.
*F16L 27/08* (2006.01)
*B23Q 11/10* (2006.01)
(Continued)

(52) U.S. Cl.
CPC ........ *F16L 27/0828* (2013.01); *B23Q 11/103* (2013.01); *F16C 33/762* (2013.01); *F16C 33/7886* (2013.01); *F16C 2322/39* (2013.01)

(58) Field of Classification Search
CPC ....... F16L 17/02; F16L 27/08; F16L 27/0824; F16L 27/0828; F16L 27/0808; F16L 27/0804; B23Q 11/03
(Continued)

(56) References Cited

U.S. PATENT DOCUMENTS 3,002,769 A    10/1961  Deubler et al.
3,339,933 A    9/1967   Phillips
(Continued)

OTHER PUBLICATIONS

ISA/US International Search Report and Written Opinion issued in corresponding PCT Application No. PCT/US2017/066629, dated Apr. 13, 2018 (14 pages).
(Continued)

*Primary Examiner* — Aaron M Dunwoody
(74) *Attorney, Agent, or Firm* — Wood Herron & Evans LLP

(57) ABSTRACT

A device for transferring a pressurized fluid from a stationary source into a rotating spindle shaft includes a stationary housing including an internal socket having a socket wall and a rotatable shaft extending into the socket. The shaft includes an outer surface and a shaft bore having inlet and outlet ends. The device includes a washer positioned over the shaft and including a first flat side surface and a second side surface having at least a portion angled with respect to the first flat side surface in operative contact with the socket wall. The device includes a bushing positioned over the shaft and including a bore having an inner surface spaced apart from the outer surface of the shaft by a gap. The bushing includes a first end surface proximate the inlet end and a second end surface in operative contact with the first flat side surface of the washer.

27 Claims, 12 Drawing Sheets

(51) Int. Cl.
*F16C 33/76* (2006.01)
*F16C 33/78* (2006.01)

(58) Field of Classification Search
USPC .......................... 285/98, 121.3, 121.4, 121.5
See application file for complete search history.

(56) References Cited

U.S. PATENT DOCUMENTS

| | | |
|---|---|---|
| 4,402,515 A | 9/1983 | Mallott |
| 5,653,476 A * | 8/1997 | Su .................. F16L 27/0828 |
| | | 285/94 |
| 5,669,636 A | 9/1997 | Kubala |
| 6,029,695 A | 2/2000 | Logan |
| 6,308,734 B1 | 10/2001 | Smith et al. |
| 2005/0200123 A1 | 9/2005 | Benson |
| 2011/0126909 A1 | 6/2011 | Burrus et al. |
| 2013/0014827 A1 | 1/2013 | Velasquez |

OTHER PUBLICATIONS

European Search Report and Written Opinion issued in corresponding EP 17883700, dated Jan. 29, 2021 (10 pages).

* cited by examiner

FLUID UNION APPARATUS AND METHOD

CROSS REFERENCE TO RELATED APPLICATIONS

This application is a U.S. National Phase Application of PCT Application No. PCT/US2017/066629 filed on Dec. 15, 2017, which claims the benefit of U.S. Provisional Patent Application No. 62/437,893, filed on Dec. 22, 2016, the contents of which are incorporated by reference herein in their entireties.

FIELD OF THE INVENTION

The present invention relates generally to machine spindles and, more particularly, to an apparatus for transferring a pressurized fluid from a stationary source into a rotating spindle shaft.

BACKGROUND OF THE INVENTION

Machine spindles are manufactured in a variety of configurations. Typically, machine spindles include three major components: a rotating spindle shaft, a stationary structure or housing that contains the shaft, and bearings that support the shaft and allow the shaft to rotate within the housing. The rotating spindle shaft usually holds a tool at one end (i.e., the work area) for performing a physical operation such as material removal, positioning, winding, flinging, etc. Many operations require the use of coolant or other fluids to clear the work area of debris and/or to provide heat removal. One pathway for introducing such fluid into the work area is through the center of the rotating spindle shaft and through the tooling into the work area. However, directing coolant into a rotating shaft from a stationary source without leaking into undesired locations presents many challenges.

Devices for introducing fluid such as coolant into a rotating shaft are commonly referred to as fluid unions, coolant unions, rotating unions, or rotating joints. Typical coolant unions include a rotatable union shaft and a stationary union housing. Some coolant unions include dedicated bearings to maintain internal alignment of the components, while others rely on the spindle shaft or other external structures for alignment. The union shaft attaches to the spindle shaft at the end opposite the work area, and includes internal holes which, when attached to the spindle shaft, transfer pressurized fluid into the spindle shaft.

Fluid unions include an interface between the stationary union housing and the rotating union shaft. This interface may include a primary seal for preventing or minimizing fluid loss in the transfer from the stationary union housing into the rotating union shaft. For example, the interface may include a contact or rubbing seal. However, performance of such seals is limited by fluid pressure and shaft rotational speed. In this regard, too much pressure can destroy the seals and overload the bearings with a piston-like force, and too much speed can generate excessive heat and wear on the seals. These limitations render such seals unsuitable for applications with demanding, i.e. relatively high, rotational speed and/or fluid pressure requirements. Alternatively, the interface may include a non-contact seal formed by a relatively short narrow gap around the rotating union shaft that allows a small amount of the fluid to leak past the interface. Such seals require very tight tolerances to minimize such control leakage, especially at high pressures, and are also subject to limitations based on union shaft size and pressure. Although the use of a longer narrow gap could reduce the jet velocity of the leak, and would theoretically thereby lower the erosive effects and extend the life of the fluid union, a longer gap would also likely present one or more alignment problems. Such problems can result in seizing of the components during rotation.

In addition to the primary seal at the interface, fluid unions typically have a secondary seal to contain or redirect fluid that leaks past the primary seal, to protect bearings and other components of the fluid union. The primary and secondary seals are spaced apart by an internal cavity that collects the leaked fluid and includes at least one drain for evacuating the leaked fluid. Secondary seals are typically provided by labyrinths or narrow gaps for higher speed operation. Labyrinth seals become ineffective when the internal cavity floods. As a result, labyrinth seals are effective only when in a specific orientation, such that the cavity is not flooded. Traditional rubbing seals are not suitable alternatives due to high heat generation and the wear that is typically caused at high speeds.

SUMMARY OF THE INVENTION

It is an object of the present invention to extend the useful life of a fluid union, thereby to reduce the downtime and assure the optimum operation of a corresponding spindle used therewith.

It is another object of the present invention to minimize coolant flow into the internal cavity of a fluid union at the inlet end thereof, while at the same time minimizing potential for seizing of the fluid union components.

It is still another object of the present invention to reduce the occurrence of flooding within the internal cavity of a fluid union.

It is still another object of the present invention to better assure the removal from the internal cavity of a fluid union any coolant that has flowed, i.e. leaked, into the internal cavity from the inlet end.

It is still another object of this invention to achieve relatively high rotational speeds with a fluid union shaft, without causing an accompanying buildup of heat.

It is still another object of the present invention to reduce the downtime and corresponding maintenance associated with spindles used in cooperation with fluid unions.

The present invention achieves one or more of these objects via several structural arrangements, all of which have an internal or secondary seal that includes an annularly shaped abrasive surface that engages an opposing flexible lip of a gasket, such that relative rotational movement therebetween causes the abrasive surface to abrade the lip such that, through use, abraded portions thereof become deposited on the abrasive surface. This internal seal structure, in combination with an adjacently located coolant discharge outlet, prevents further flow of the leaked pressurized coolant along the internal cavity, thereby preventing coolant from leaking into the bearings, which are further "downstream" therefrom.

According to one preferred embodiment of the invention, the lip of the gasket which forms part of the internal seal is step-shaped and biased into contact with the abrasive surface. Alternatively, the lip may be V-shaped. The material of the abrasive surface may be metal, and the lip of the gasket may be polytetrafluoroethylene. After some initial abrading has begun between the engaged and rotating surfaces, with some of the abraded lip becoming held by and located within the abrasive surface, the annular region of surface engagement creates a light contact seal of the same materials, i.e. the lip itself, and the abraded portions of the lip now embedded in the abrasive surface. As a result, this structure does not generate excessive heat during use, even at relatively high rotational speeds of the fluid union shaft.

According to one variation of the invention, which even further reduces the likelihood of heat buildup, this internal seal structure cooperates with additional structure which supplies a circumferentially uniform flow of purge fluid at a "downstream" side of the engaging surfaces, i.e. the side opposite the leaked fluid, so as to cause the lip to slightly lift off or elevate away from the abrasive surface during relative rotation therebetween. This circumferentially uniform flow of purge fluid prevents ingress of the pressurized fluid, i.e. the leaked coolant, beyond the lip. This structure is similar to the AirShield® seal developed by applicant, and disclosed in U.S. Pat. Nos. 5,727,095, 5,980,115, 6,217,219, and 7,090,220, each of which is expressly incorporated by reference herein, in its entirety.

The present invention can be adapted to a fluid union that accommodates an axially directed source of pressurized coolant, or a radially directed source of pressurized coolant.

The present invention also contemplates the use of additional housing structure at the inlet end of the fluid union, so as to substantially reduce the amount of pressurized fluid leakage into the internal cavity.

According to one embodiment of the invention, a floating bushing tracks the fluid union shaft to maintain a gap therebetween via engagement of the axially directed surfaces of the bushing with upstream and downstream components of the fluid union. The floating bushing has self-alignment capabilities and reduces the dependency on tolerances and errors to those of bearing runout, shaft seal journal runout defining the inner portion of the narrow gap, shaft seal journal diameter variation, and floating bushing inside diameter variation. The floating bushing enables applicant to achieve greater gap lengths, such as in the range of 18 mm to 22 mm, a feat which has not been previously attainable.

According to one variation of the invention, a spherical washer is the downstream component which engages one of the axially directed surfaces of the bushing. The flat surface of the spherical washer engages the axially directed surface of the bushing and the curved surface of the spherical washer engages a non-complementary interior surface of the housing. As a result, the spherical washer can cause the bushing to tilt angularly, such as in response to misalignment or slight movement of the fluid union shaft.

According to one variation of the invention, a spring-loaded bushing seal is the upstream component which engages the other axially directed surface of the bushing. The spring-loaded bushing seal biases the bushing and the washer in the axial direction toward the interior surface of the housing.

By maintaining a narrow gap between the floating bushing and the rotating fluid union shaft, and by affirmatively preventing further axial flow of pressurized fluid beyond the internal seal, the invention disclosed herein extends the useful life of a fluid union, and also reduces the downtime associated with fluid union failures. Moreover, the invention disclosed herein achieves these advantageous features while also minimizing the potential for seizing of the components, due in part to the bushing and the adjacently located components that permit the bushing to "float."

The disclosed invention also reduces flooding in the internal cavity, and assures removal of leaked coolant from the internal cavity. More specifically, the like materials of the internal seal, after abrading, create an effective and circumferentially uniform seal. This effect, in combination with the affirmative flowing of purge fluid from the opposite side of the seal, promotes continuous outflow from the discharge port of the combined purge fluid and leaked coolant. This continuous outflow protects the fluid union bearings, which are located further "downstream." This also prevents coolant from leaking out the fluid union and damaging the spindle and other peripheral equipment.

In addition, the like materials of the opposing surfaces of the internal seal, in combination with the supplying of the purge fluid, enable the invention disclosed herein to achieve relatively high rotational speeds, but without the typical accompanying buildup of heat.

These advantageous features, described above with respect to the fluid union disclosed herein, also apply to the spindles that are operatively connected thereto. That is, this inventive fluid union results in reduced overall downtime and reduced maintenance for any spindle operatively connected thereto, thereby enabling the spindle to be used more productively.

Further details and advantages of this invention will become more apparent to those skilled in the art upon reviewing the following detailed description in conjunction with the accompanying drawings, which show several preferred embodiments of the invention.

DETAILED DESCRIPTION OF THE INVENTION

With reference to FIGS. 1-5B, an exemplary fluid union 10 for transferring a pressurized fluid from a stationary source into a rotating spindle shaft is shown in accordance with one embodiment of the present invention. As set forth in further detail below, the fluid union 10 is capable of achieving a longer life than prior art fluid unions, even when subjected to the harsh combination of high fluid pressure and high rotational speed. In this regard, the fluid union 10 includes a primary seal provided by at least one long narrow gap that maintains accurate alignment to avoid seizing of the components. The fluid union 10 also includes a secondary seal provided at least in part by a flexible lip configured to at least partially abrade on a rotating contact surface for providing a very light contact force therebetween. The features of the fluid union 10 are set forth in further detail below to clarify each of these functional advantages and other benefits provided in this disclosure.

Figure 1:
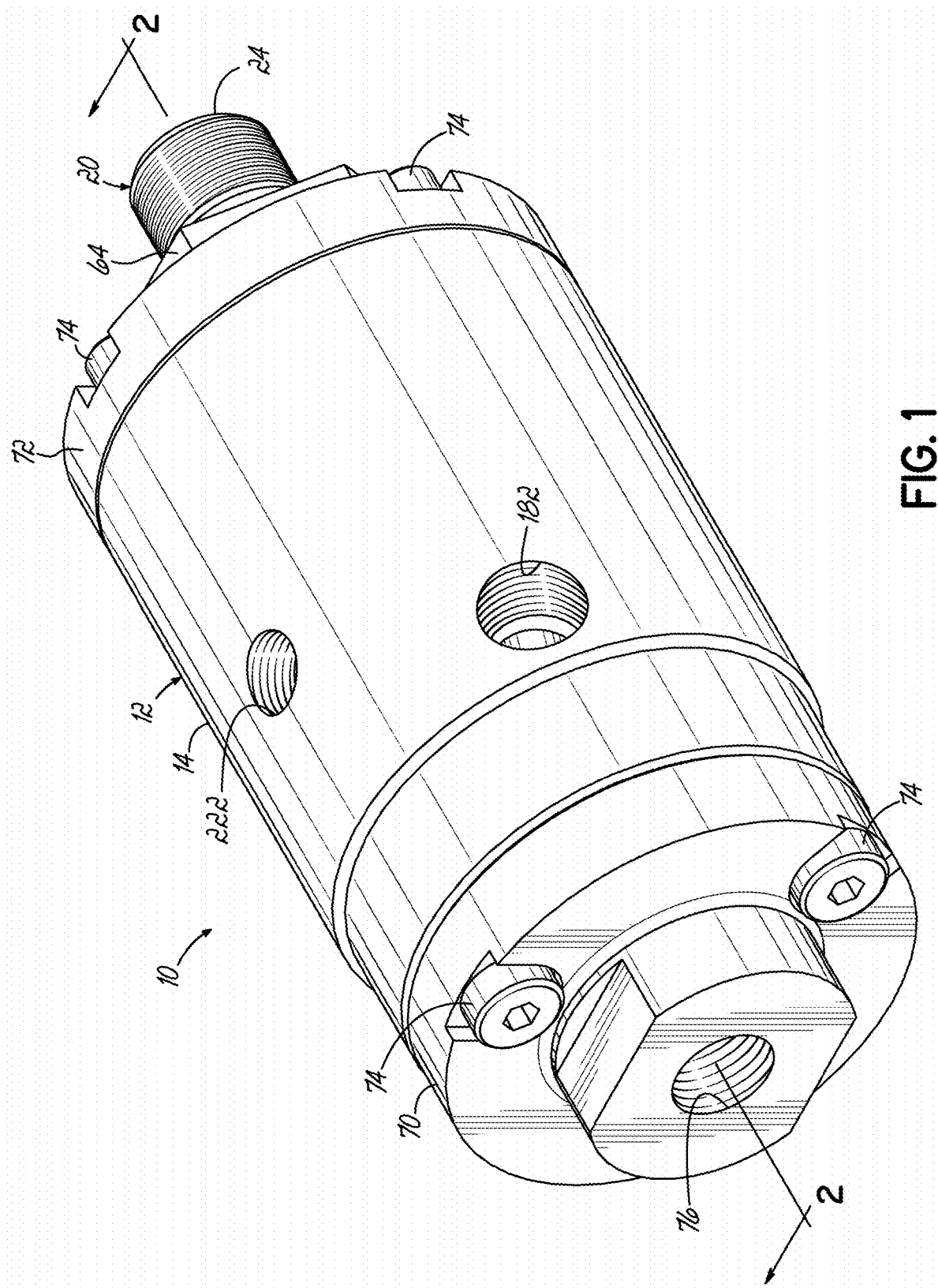
FIG. 1 is a perspective view of a fluid union according to a first preferred embodiment of the invention, with an axially directed supply of pressurized fluid, a "floating" bushing located adjacent an inlet end of the fluid union, a step-shaped gasket included as part of the internal seal and a discharge port downstream thereof.
Figure 2:
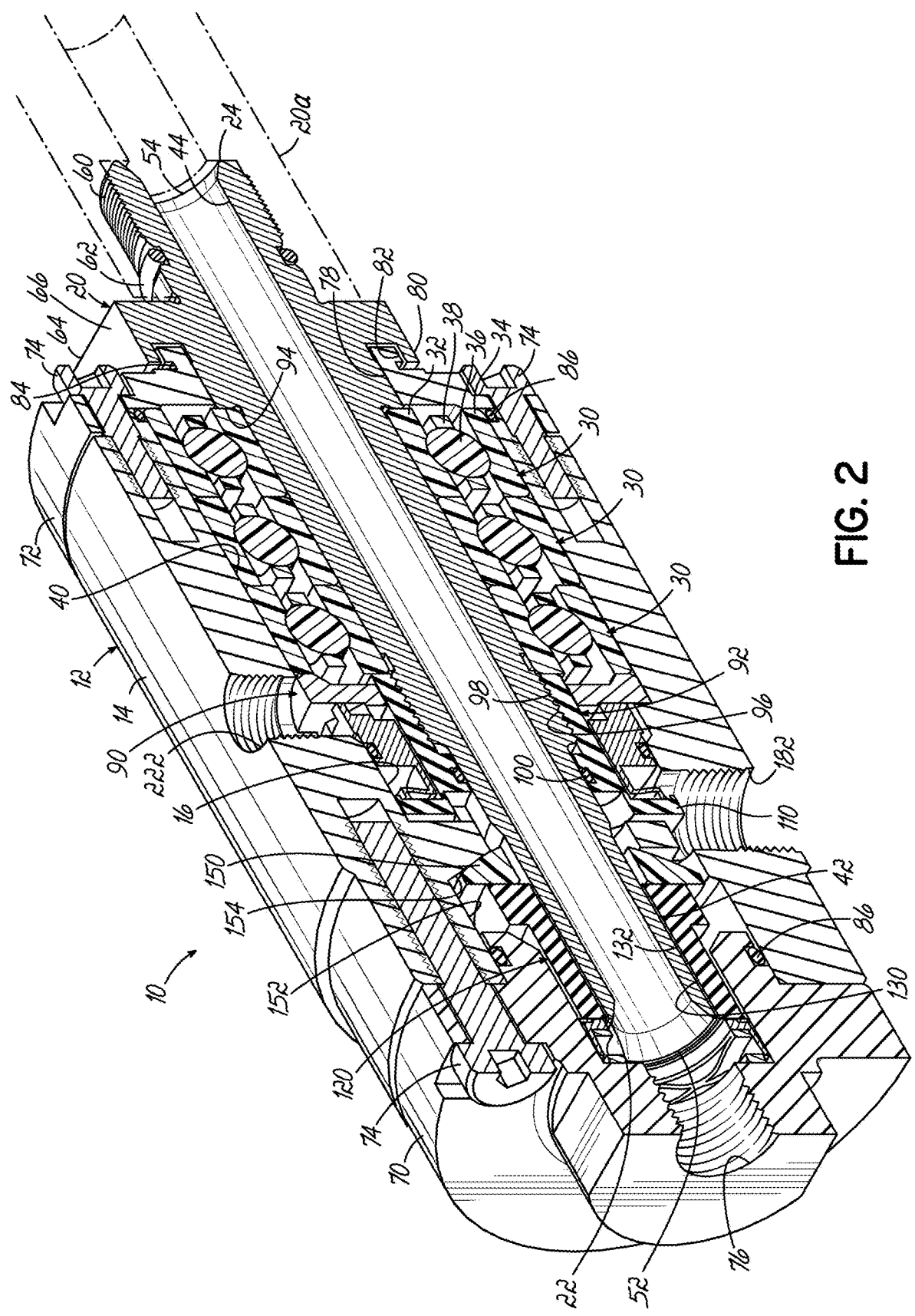
FIG. 2 is a schematic longitudinal sectional view of the fluid union of FIG. 1, taken along section line 2-2 of FIG. 1.
Figure 3:
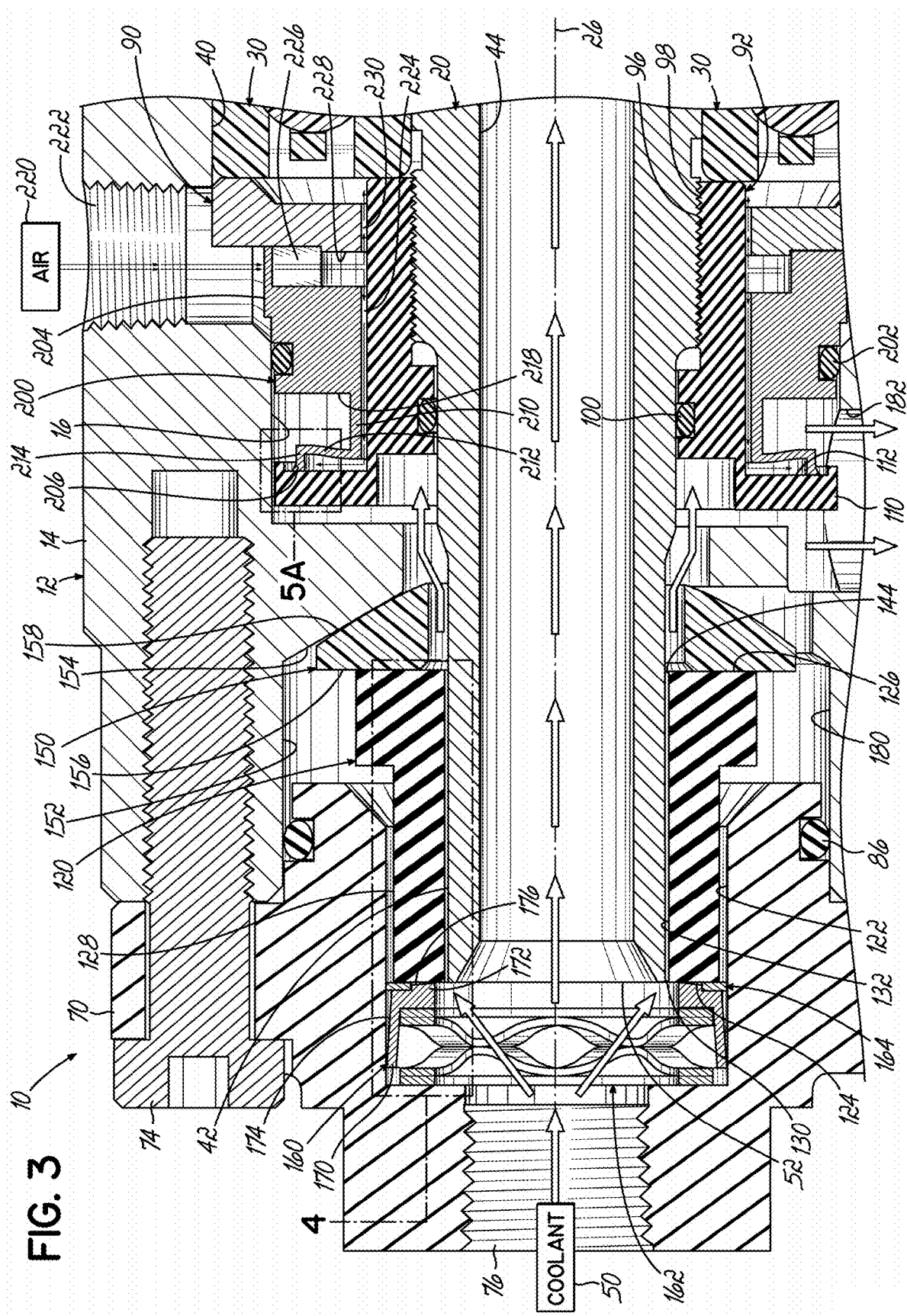
FIG. 3 is a partial cross sectional view of the fluid union shown in FIG. 2.

As best shown in FIGS. 2 and 3, the fluid union 10 includes a stationary housing 12 having a generally cylindrical body 14 with a hollow interior 16. In one embodiment, the stationary housing 12 may be integrally formed together with the housing of the spindle shaft as a unitary piece. In any event, a shaft 20 having first and second ends 22, 24 extends at least partially into the hollow interior 16 of the stationary housing 12 and is rotatable relative thereto about a longitudinal axis 26. In this regard, three ball bearings 30 are positioned between the stationary housing 12 and the rotatable shaft 20 for maintaining alignment therebetween. Each ball bearing 30 includes an inner race 32, an outer race 34, a plurality of bearing balls 36, and a cage or retainer 38. While three ball bearings 30 are shown, it will be appreciated that any suitable number and/or type of bearings may be used to allow rotation of the rotatable shaft 20 relative to the stationary housing 12 and maintain alignment therebetween. In the embodiment shown, the cylindrical body 14 defines a bearing chamber 40 in which the ball bearings 30 reside.

The rotatable shaft 20 includes an outer surface 42 and a shaft bore 44 extending along the longitudinal axis for directing pressurized fluid such as coolant therethrough. In this regard, the shaft bore 44 has an inlet end 52 at the first end 22 of the shaft 20 and an outlet end 54 at the second end 24 of the shaft 20. The inlet end 52 is configured to receive the pressurized fluid from a stationary source 50, such as a fluid reservoir, shown schematically in FIG. 3. As shown in FIG. 2, the outer surface 42 of the rotatable shaft 20 includes a threaded portion 60 proximate the second end 24 for threadably coupling the rotatable shaft 20 to the spindle shaft 20a for directing the pressurized fluid from the shaft bore 44 into the rotating spindle shaft. A gasket, such as an O-ring 62, is positioned over the outer surface 42 of the rotatable shaft 20 proximate the second end 24 for providing a fluid tight seal between the rotatable shaft 20 and the spindle shaft. In the embodiment shown, the outer surface 42 of the rotatable shaft 20 includes a generally hex-shaped portion 64 proximate the second end 24 and defining a plurality of flats 66 to provide gripping points for a tool, such as a wrench, to allow tight threadable coupling of the rotatable shaft 20 to the spindle shaft 20a, shown schematically in FIG. 2. While a threadable coupling is provided by the illustrated embodiment, the rotatable shaft 20 may be coupled to the spindle shaft in any suitable manner. In one embodiment, the rotatable shaft 20 and the spindle shaft may be integrally formed together as a unitary piece.

In the embodiment shown, the stationary housing 12 includes first and second end caps 70, 72 removably coupled to the generally cylindrical body 14 at opposite ends thereof via fasteners, such as bolts or screws 74. The first end cap 70 includes a stationary pressurized fluid inlet port 76 for directing the pressurized fluid from the stationary source to the inlet end 52 of the shaft bore 44. As shown, the fluid inlet port 76 is coaxial with the rotatable shaft 20 such that the pressurized fluid may enter the shaft bore 44 in an axial manner. Alternatively, the fluid inlet port 76 may be positioned elsewhere, such as at the periphery of the first end cap 70. In the embodiment shown, the fluid inlet port 76 is threaded for providing a threadable coupling to a hose, for example (not shown). In any event, the second end cap 72 retains the outer races 34 of the ball bearings 30 in the bearing chamber 40 and has a bore 78 through which the second end 24 of the shaft 20 extends for coupling to the spindle shaft. In the embodiment shown, the rotatable shaft 20 includes a flange 80 which envelopes a portion of the second end cap 72 to form a labyrinth 82 for inhibiting external contaminants from entering the fluid union 10. The second end cap 72 includes an annular groove 84 at or near the interface with the rotatable shaft 20 for redirecting contaminants out of and away from the labyrinth 82. Gaskets, such as O-rings 86, are positioned between the generally cylindrical body 14 and the end caps 70, 72 for providing a fluid tight seal therebetween.

In the embodiment shown, a seal spacer 90 is positioned within the hollow interior 16 of the stationary housing 12 and is held in place by the force thereon by the second end cap 72 via the outer races 34 of the ball bearings 30. The purpose of the seal spacer 90 is described in greater detail below.

A nut 92 is threadably coupled to the rotatable shaft 20 within the hollow interior 16 of the stationary housing 12 and retains the inner races 32 of the ball bearings 30 relative to the rotatable shaft 20 by compressing the inner races 32 against a shoulder 94 of the rotatable shaft 20. In this regard, the nut 92 includes a threaded surface 96 and the outer surface 42 of the rotatable shaft 20 includes a corresponding threaded portion 98 for engaging the threaded surface 96 of the nut 92. Thus, the nut 92 and the inner races 32 of the ball bearings 30 are rotatable together with the rotatable shaft 20 with respect to the stationary housing 12. A gasket, such as an O-ring 100, is positioned between the nut 92 and the outer surface 42 of the rotatable shaft 20 for providing a fluid tight seal therebetween. As shown, the nut 92 includes a flange 110 extending radially outwardly away from the rotatable shaft 20 and having an abrasive surface, such as a striated surface 112, the purpose of which is described below.

Figure 4:
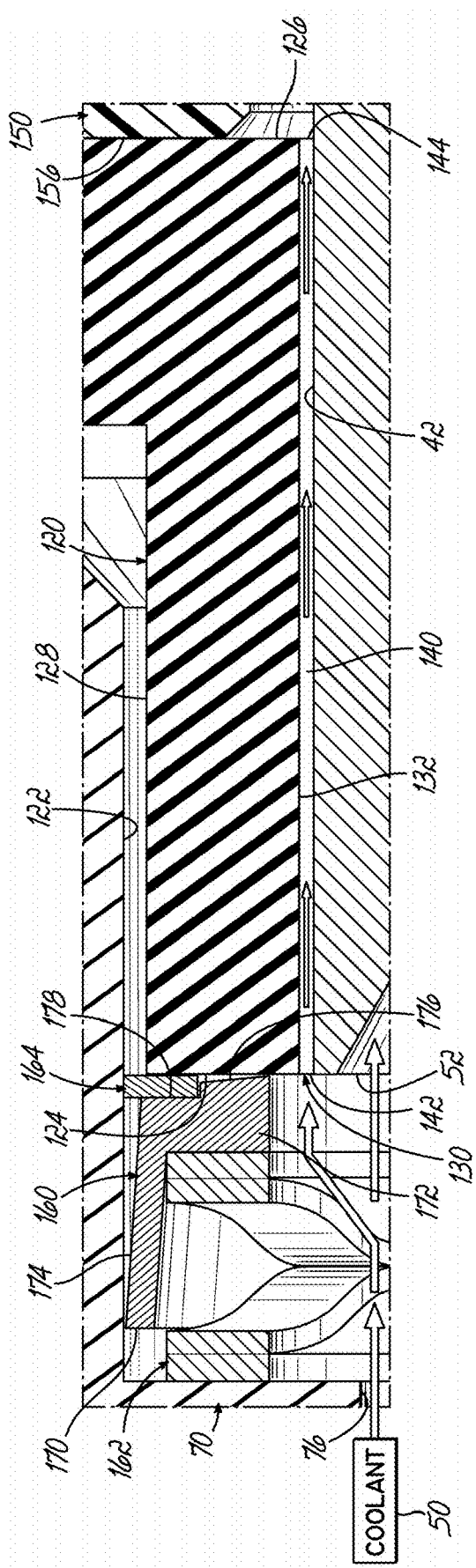
FIG. 4 is a magnified view of a portion of the fluid union shown in FIG. 3, based on detail area 4, at the inlet end of the fluid union shaft.
Figure 5:
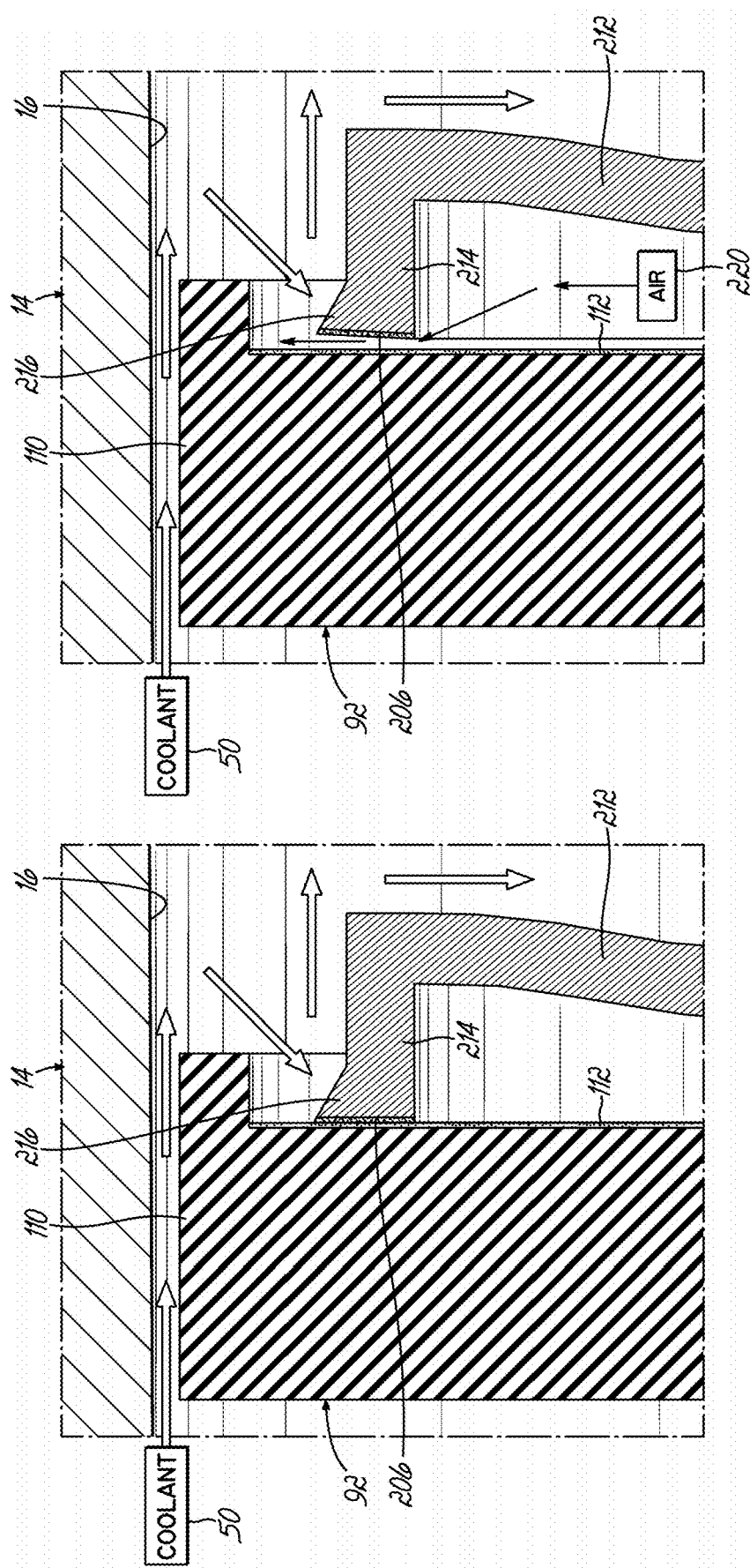
FIG. 5A is a magnified view of the fluid union shown in FIG. 3, based on detail area 5A, showing the lip of the internal seal in a first condition.
FIG. 5B is a magnified view similar to FIG. 5A, showing the lip of the internal seal in a second condition.

The illustrated embodiment includes a floating bushing 120 positioned over the rotatable shaft 20 within the hollow interior 16 of the stationary housing 12. More particularly, the first end cap 70 and/or the cylindrical body 14 define a bushing chamber 122 in which the floating bushing 120 resides. The floating bushing 120 includes first and second end surfaces 124, 126, an outer surface 128, and a bushing bore 130 having an inner surface 132. As best shown in FIG. 4, the inner surface 132 is spaced apart from the outer surface 42 of the rotatable shaft 20 by a longitudinal gap 140 extending between a gap inlet 142 at the first end surface 124 of the floating bushing 120 and a gap outlet 144 at the second end surface 126 of the floating bushing 120 for allowing controlled leakage of a portion of the pressurized fluid flowing toward the shaft bore 44 from the fluid inlet port 76. In this manner, the gap 140 may provide the primary seal of the fluid union 10.

In one embodiment, the gap 140 may have a substantially narrow width between the inner surface 132 of the bushing bore 130 and the outer surface 42 of the rotatable shaft 20. For example, the gap 140 may have a width of no more than approximately 0.001 inch. In one embodiment, the gap 140 may have a width of no more than approximately 0.0005 inch. In addition or alternatively, the gap 140 may have a substantially long length between the gap inlet 142 and the gap outlet 144. For example, the gap 140 may have a length of at least approximately 18 mm. In one embodiment, the length may be approximately 22 mm. In one embodiment, the ratio of the length of the gap 140 to the outer diameter of the rotatable shaft 20 may be at least approximately 1.4. In one embodiment, the ratio may be approximately 2.1. Thus, the long narrow gap 140 may provide a low rate of controlled leakage of the pressurized fluid as compared to shorter and/or wider gaps of the prior art. As described in greater detail below, the floating bushing 120 is generally retained within the bushing chamber 122 while being permitted to float in order to self-align angularly and/or radially with the rotatable shaft 20 and avoid seizing therewith, such as during high-speed rotation of the rotatable shaft 20. In this manner, the fluid union 10 may maintain the integrity of the long narrow gap 140 to minimize the rate of controlled leakage while also resisting wear.

To that end, a washer 150 is positioned over the rotatable shaft 20 within the hollow interior 16 of the stationary housing 12 adjacent the second end surface 126 of the floating bushing 120. More particularly, the washer 150 is positioned within a washer socket 152 defined by the cylindrical body 14 and having a generally frustoconical socket wall 154. The washer 150 includes a first substantially flat side surface 156 and a second side surface 158 having at least a portion angled with respect to the first substantially flat side surface 156. For example, in the embodiment shown, the second side surface 158 is convex or otherwise curved such that the washer 150 may be considered spherical. Alternatively, the second side surface 158 may be substantially flat and angled with respect to the first side surface 156. In any event, the first side surface 156 of the washer 150 is in operative contact with the second end surface 126 of the floating bushing 120, and the second side surface 158 is in operative contact with the socket wall 154. In this manner, the interface between the washer 150 and the socket wall 154 may control the angular orientation of the floating bushing 120 relative to the longitudinal axis 26, such that the floating bushing 120 may be permitted to angularly self-align in response to angular misalignment or slight movement of the rotatable shaft 20, for example. More particularly, the floating bushing 120 may angularly self-align such that the longitudinal axis of the floating bushing 120 may be parallel to the longitudinal axis 26 of the rotatable shaft 20 even when the longitudinal axis 26 of the rotatable shaft 20 tilts angularly. Angular self-alignment of the floating bushing 120 may be triggered by the outer wall 42 of the rotatable shaft 20 bumping the inner wall 132 of the floating bushing 120 at or near the inlet end 22 and may thereby prevent the outer wall 42 from binding with the inner wall 132. The self-alignment capability of the floating bushing 120 may counteract misalignment and tolerance stack-up induced by dimensional variations of the housing 12, shaft 20, bearings 30, spacer 90, bushing bore 130, and tightening load variations of bolts or screws 74. The angular adjustability of the floating bushing 120 compensates for the angular portion of the initial misalignment caused by part variations.

In addition or alternatively, the interface between the floating bushing 120 and the washer 150 may allow sliding motion therebetween to control the radial positioning of at least the second end surface 126 of the bushing 120 generally perpendicularly relative to the longitudinal axis 26, such that the floating bushing 120 may be permitted to at least partially radially self-align in response to radial misalignment or slight movement of the rotatable shaft 20, for example. More particularly, the floating bushing 120 may radially self-align such that the longitudinal axis of the floating bushing 120 may be coaxial with the longitudinal axis 26 of the rotatable shaft 20 to compensate for the radial portion of initial misalignment caused by part variations even when the longitudinal axis 26 of the rotatable shaft 20 moves slightly radially. In one embodiment, the interface between the washer 150 and the socket wall 154 may be configured such that there are three distinct contact points therebetween to provide accurate alignment with reduced rocking motion between the washer 150 and socket wall 154 caused by manufacturing imperfections. Additionally, three raised contact points may be applied at the interface between the floating bushing 120 and the washer 150 to prevent rocking motion between the floating bushing 120 and washer 150 caused by manufacturing imperfections.

In the embodiment shown, a spring-loaded bushing seal 160 is positioned between the first end cap 70 and the first end surface 124 of the floating bushing 120. More particularly, the bushing seal 160 is spring loaded by a wave spring 162 which abuts the first end cap 70 for axially biasing the floating bushing 120 and the washer 150 toward the second end 24 of the rotatable shaft 20. Together, the first end cap 70, wave spring 162, bushing seal 160, washer 150, and socket wall 154 retain the floating bushing 120 within the bushing chamber 122. While a wave spring 162 is shown, any suitable type of spring may be used. In any event, the interface between the bushing seal 160 and the floating bushing 120 may allow sliding motion therebetween to control the radial and angular positioning of at least the first end surface 124 of the bushing 120 generally perpendicularly relative to the longitudinal axis 26, such that the floating bushing 120 may be permitted to self-align as the washer 150 angularly tilts floating bushing 120 and as the second end surface 126 of floating bushing 120 slides radially relative to surface 156 of washer 150 in response to initial misalignment or slight radial or angular movement of the rotatable shaft 20, for example. More particularly, the floating bushing 120 may radially and angularly self-align such that the longitudinal axis of the floating bushing 120 may be coaxial with the longitudinal axis 26 of the rotatable shaft 20 even when the longitudinal axis 26 of the rotatable shaft 20 is initially misaligned or moves slightly radially or angularly. In the embodiment shown, a rigid anti-creep ring 164 is positioned adjacent the first end surface 124 of the floating bushing 120 to prevent portions of the bushing seal 160 from entering the space between the outer surface 128 of the floating bushing 120 and the wall of the bushing chamber 122, such as when pressurized fluid is present. In one embodiment, an anti-rotation pin (not shown) may be positioned in operative contact with each of the floating bushing 120 and a portion of the stationary housing 12, such as the first end cap 70, for inhibiting rotation of the floating bushing 120 about the longitudinal axis 26.

Thus, the floating bushing 120 is generally retained in position between the bushing seal 160 and the washer 150 while having the ability to float so as to maintain alignment and/or adjust position in the event that the rotatable shaft 20 is impacted or deflects from an excessive external force, for example. As the pressure of the pressurized fluid increases, the clamping force holding the floating bushing 120 in place against the washer 150 also increases, thereby assisting in maintaining the floating bushing 120 in place in the presence of the pressurized fluid.

In the embodiment shown, the bushing seal 160 has a dual-angled L-shaped cross section. More particularly, the bushing seal 160 includes first and second transverse legs 170, 172. The first leg 170 includes an angled outer surface 174 which tapers inwardly toward the second leg 172 and the second leg 172 includes an angled end surface 176 which tapers inwardly toward the first leg 170. As shown, the bushing seal 160 also includes a recess 178 for accommodating the anti-creep ring 164. When pressurized fluid is present, the bushing seal 160 may flex such that the outer surface 174 conforms to the wall of the bushing chamber 122, including surface defects thereof, and the end surface 176 conforms to the first end surface 124 of the floating bushing 120, including surface defects thereof, in order to prevent pressurized fluid from entering the space between the outer surface 128 of the bushing 120 and the wall of the bushing chamber 122. Other suitable configurations of the bushing seal 160 may be used, such as those having a more perpendicular L-shaped cross section.

In one embodiment, the rotatable shaft 20 may be at least partially coated in a hard carbon coating for increasing the durability of the gap 140 between the rotatable shaft 20 and the floating bushing 120. For example, the outer surface 42 of the rotatable shaft 20 may be at least partially coated in a carbon coating having a hardness of at least approximately Rc80. In one embodiment, the hard carbon coating may have a hardness of approximately Rc90. In addition or alternatively, the floating bushing 120 may be at least partially constructed of zirconia for improving corrosion resistance and/or durability of the gap 140. For example, the inner surface 132 of the floating bushing 120 may be at least partially constructed of zirconia to reduce galling and/or seizing with the outer surface 42 of the rotatable shaft 20. In one embodiment, the floating bushing 120 may have a hardness of at least approximately Rc73. For example, the floating bushing 120 may have a hardness of approximately Rc82. In addition or alternatively, the zirconia may be Yttria-stabilized.

A fluid collection cavity 180 is provided in the hollow interior 16 downstream of the gap outlet 144 for collecting leaked pressurized fluid. The collection cavity 180 may depressurize the leaked pressurized fluid exiting the gap outlet 144 and direct the fluid into one or more drains 182 extending through the cylindrical body 14 of the stationary housing 12 for evacuating the leaked fluid from the fluid union 10. In the embodiment shown, the drains 182 are threaded such that one or more hoses (not shown) may be threadably attached to the drains 182 to direct the leaked fluid into a tank or other desired area.

The illustrated embodiment includes a gasket 200 positioned between the stationary housing 12 and the outer surface 42 of the rotatable shaft 20 downstream of the gap outlet 144. An O-ring 202 is positioned between the gasket 200 and the stationary housing 12 for providing a fluid-resistant seal therebetween. The gasket 200 includes a plug 204 and a flexible lip 206 for forming a fluid-resistant seal with the flange 110 of the nut 92 and thereby prevent leaked fluid from escaping the collection cavity 180 into other components of the fluid union 10, such as the ball bearings 30. In this manner, the gasket 200 may provide the secondary seal of the fluid union 10.

In one embodiment, the gasket 200 may be constructed of a relatively flexible material, such as a chemically resistant elastomer with a low coefficient of friction. For example, the lip 206 of the gasket 200 may be at least partially constructed of polytetrafluoroethylene. The gasket 200 may be held in place with respect to the stationary housing 12 by an interference fit and/or by external fasteners such as screws or adhesive (not shown). In any event, at least a portion of the lip 206 of the gasket 200 rests against the abrasive surface 112 of the flange 110 of the nut 92. As the nut 92 rotates with the rotatable shaft 20, the lip 206 of the gasket 200 wears and is at least partially abraded by the abrasive surface 112, such that the abraded portion is deposited on the abrasive surface 112 of the flange 110 to provide smooth, low-friction contact between the flange 110 and the lip 206 as shown in FIG. 5A. In this manner, the rotatable shaft 20 may be operated at high speeds, such as 20,000 rpm, without generating undesirable heat at the interface between the lip 206 and the flange 110 or otherwise compromising performance of the fluid union 10. By partially abrading the lip 206 and depositing the abraded portion on the abrasive surface 112 to provide the smooth, low-friction contact, tolerance stack-ups resulting from imprecisions in manufacturing and/or assembly of the fluid union 10 may be overcome while achieving fluid-resistant contact between the lip 206 and the flange 110. In this regard, the contact force of the flange 110 against the lip 206 may slightly deform the lip 206 such that, as the lip 206 wears, the lip 206 continues to be urged into contact with the abrasive surface 112 of the flange 110.

In the embodiment shown, the flexible lip 206 has a generally step-shaped cross section. More particularly, the flexible lip 206 includes a generally cylindrical base portion 210 extending in a generally axial direction from an inner portion of the plug 204 toward the flange 110, a generally discoid middle portion 212 extending generally radially outwardly from the base portion 210, and a generally cylindrical step portion 214 extending in a generally axial direction from the middle portion 212 toward the flange 110 and configured to be at least partially abraded by the abrasive contact surface 112. In this regard, the step portion 214 may be relatively thick such that the step portion 214 is capable of withstanding the dragging forces exerted thereon by the flange 110 of the nut 92. For example, the step portion 214 may have a thickness of approximately 0.025 in. The illustrated step portion 214 includes an angled tip 216 for directing leaked fluid away from the abrasive contact surface 112 of the flange 110. In addition or alternatively, the middle portion 212 may be relatively thin such that the middle portion 212 is capable of flexing or bending the step portion 214 toward or away from the abrasive contact surface 112 of the flange 110. For example, the middle portion 212 may have a thickness of approximately 0.010 in.

The step-shape may reduce the possibility of permanent deformation of the lip 206 to ensure that at least a portion of the lip 206 (e.g., the step portion 214) remains capable of contacting the flange 110 to form a fluid-resistant seal therewith. In this regard, the base portion 210 may be substantially rigid in the axial direction and the step portion 214 may be short enough such that the lip 206 may flex without permanent deformation upon contact between the abrasive surface 112 and the step portion 214, even in cases where the flange 110 becomes displaced axially toward the gasket 200. In this regard, the base portion 210 of the lip 206 may limit movement of the flange 110 in the axial direction toward the gasket 200, such that when the flange 110 bottoms out on the axially-rigid base portion 210 (e.g., during assembly and disassembly processes) the flange 110 may not be capable of inducing further flexing of the lip 206, which may otherwise result in permanent deformation.

In the embodiment shown, the step-shaped lip 206 defines an open relief cavity 218 that allows an increased volume of leaked fluid in the fluid collection cavity 180. Such an increase in volume may result in an increased capacity of the fluid collection cavity 180 for throttling the leaked fluid from the gap outlet 144 to a low pressure or near zero pressure.

In one embodiment, the fluid union 10 may include a gas purge system configured to provide pressurized gas, such as air 220, to the stationary housing 12 for directing the leaked fluid toward the at least one drain 182 and/or away from the lip 206 of the gasket 200. The gas purge system may be similar to those described in U.S. Pat. Nos. 5,727,095, 5,980,115, 6,217,219, and/or 7,090,220, the contents of which are incorporated herein in their entireties.

In the embodiment shown, the cylindrical body 14 includes a gas inlet port 222 extending radially therethrough for directing a pressurized gas, such as air 220, from a gas source (not shown) into the hollow interior 16. In this regard, the gas inlet port 222 may be threaded for providing a threadable coupling with a hose, for example. As shown, the plug 204 and base portion 210 of the gasket 200 are spaced apart from the nut 92 by a gas purge gap 224. The seal spacer 90 and/or gasket 200 define one or more tangential ducts 226 for receiving pressurized air 220 from the gas inlet port 222 and redirecting the pressurized air 220 to flow tangentially into an internal annular pocket 228 defined by the seal spacer 90 and/or gasket 200 and subsequently into the gas purge gap 224. More particularly, the ducts 226 may be tangential to a circle that is concentric with the rotatable shaft 20. The pressurized air 220 may circulate within the annular pocket 228 to create a substantially uniform pressure distribution therein and travel through the gas purge gap 224 toward the lip 206 of the gasket 200. As best shown in FIG. 5B, the pressurized air 220 may deflect at least the step portion 214 of the lip 206 away from the abrasive contact surface 112 of the flange 110 and repel the leaked fluid away therefrom. In this manner, the pressurized air 220 may contribute to providing the secondary seal for preventing internal contamination of components of the fluid union 10, such as the ball bearings 30, and may allow the secondary seal to operate in a substantially frictionless state. This may enable higher rotational speed of the rotatable shaft 20 and/or longer life of the gasket 200.

As shown, the seal spacer 90 is spaced apart from the nut 92 by a gas escape gap 230. A portion of the pressurized air 220 may exit the annular pocket 228 via the gas escape gap 230 and flow through the ball bearings 30, between the second end cap 72 and rotatable shaft 20, and out of the fluid union 10. It will be appreciated that the size of the gas escape gap 230 and/or the spacing between the second end cap 72 and rotatable shaft 20 may restrict the amount of air flow through the ball bearings 30. The resulting internal pressure within the bearing chamber 40 may assist in preventing external contaminants from entering the fluid union 10 through the labyrinth 82 between the second end cap 72 and the rotatable shaft 20. In one embodiment, the labyrinth 82 may be replaced with a gasket having a flexible lip similar to the gasket 200 of the secondary seal for improved prevention of external contamination.

In operation, pressurized fluid such as coolant is introduced into the fluid union 10 via the stationary fluid inlet port 76 of the first end cap 70. The majority of the pressurized fluid enters the shaft bore 44 of the rotatable shaft 20 at the inlet end 52 thereof and flows through the shaft bore 44 to the outlet end 54, where it may be transferred from the fluid union 10 to the spindle shaft. A portion of the pressurized fluid is permitted to leak through the gap 140 between the floating bushing 120 and the rotatable shaft 20 and flows into the collection cavity 180. Fluid pressure and/or the force of the wave spring 162 exerted on the first end surface 124 of the floating bushing 120 may assist in maintaining the floating bushing 120 in proper alignment with the rotatable shaft 20. In the event of an impact or other external force on the fluid union 10, the floating bushing 120 may self-align angularly and/or radially with the rotatable shaft 20 as described above and thereby maintain the integrity of the gap 140. The fluid union 10 may be operated with or without pressurized gas, such as air 220. When pressurized air 220 is not present, the fluid-resistant seal provided by the gasket 200 may prevent the leaked fluid collected in the collection cavity 180 from contaminating the ball bearings 30 or other components of the fluid union 10. When pressurized air 220 is present, the pressurized air 220 may enhance the fluid-resistant sealing capacity provided by the gasket 200, and direct the leaked fluid away from the gasket 200 in order to extend the life and capability of the gasket 200. The drains 182 evacuate the leaked fluid from the collection cavity 180, and the leaked fluid may be subsequently plumbed via one or more hoses to a desirable location such as a tank or reservoir.

Figure 6:
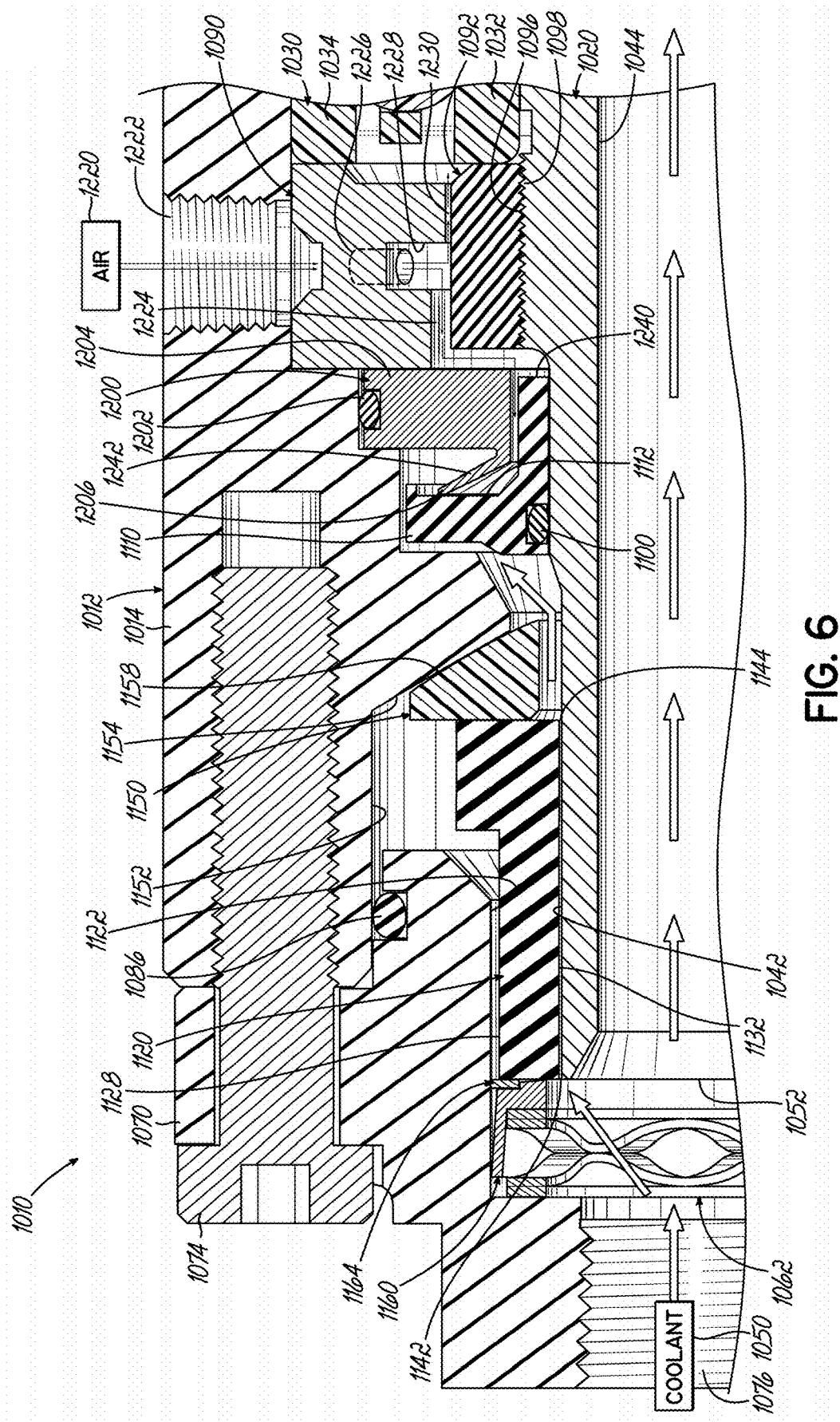
FIG. 6 is a partial cross sectional view of a fluid union, similar to FIG. 3, according to a variation of the first preferred embodiment of the invention, with a V-shaped lip.

Referring now to FIG. 6, wherein like numerals represent like features, an exemplary fluid union 1010 for transferring a pressurized fluid from a stationary source 1050 into a rotating spindle shaft is shown in accordance with another embodiment of the present invention. The primary differences between the fluid union 1010 of this embodiment and the fluid union 10 of the previously described embodiment relate to the secondary seal. As shown, the nut 1092 which threadably couples to the rotatable shaft 1020 to retain the inner races 1032 of the ball bearings 1030 fixed relative thereto is flangeless. Thus, the flange 1110 having the abrasive contact surface 1112 for confronting the lip 1206 of the gasket 1200 is provided on a flinger 1240 which presses on to the rotatable shaft 1020. In the embodiment shown, the flinger 1240 is coupled to the rotatable shaft 1020 via an interference fit. In addition or alternatively, external fasteners such as screws or adhesive may be used (not shown). As shown, an O-ring 1100 is positioned between the flinger 1240 and the rotatable shaft 1020 to provide a fluid-resistant seal therebetween.

The gasket 1200 of this embodiment includes a flexible lip 1206 that has a generally V-shaped cross section. More particularly, the flexible lip 1206 includes a generally frustoconical portion 1242 extending outwardly from an inner portion of the plug 1204 toward the flange 1110 and configured to be at least partially abraded by the abrasive contact surface 1112 of the flange 1110 in a manner similar to the step portion 214 of the previous embodiment. In one embodiment, pressurized gas such as air 1220 from a gas purge system may be configured to deflect at the frustoconical portion 1242 away from the abrasive contact surface 1112 in a manner similar to the step portion 214 of the previous embodiment. As shown, the plug 1204 of the gasket 1200 is held in place between the seal spacer 1090 and the stationary housing 1012, and an O-ring 1202 is positioned between the gasket 1200 and the stationary housing 1012 for providing a fluid-resistant seal therebetween.

Various other aspects of the fluid union 1010 are similar to those described above with regard to the previous embodiment and will be readily understood, and thus are not repeated here for the sake of brevity.

Figure 7:
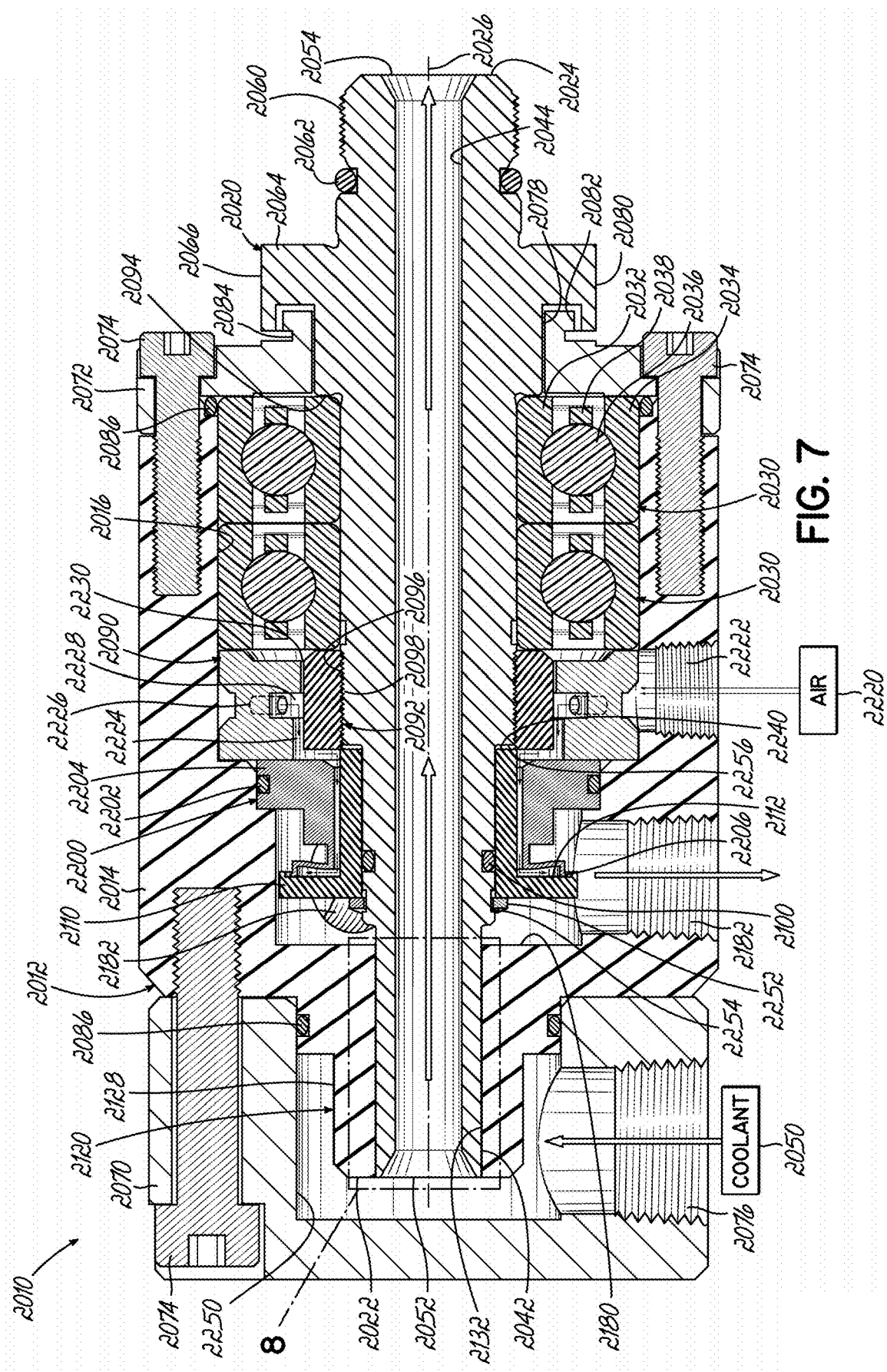
FIG. 7 is a cross sectional view of a fluid union according to a second preferred embodiment of the invention, with radially directed supply of pressurized fluid, at one end of the fluid union housing.
Figure 8:
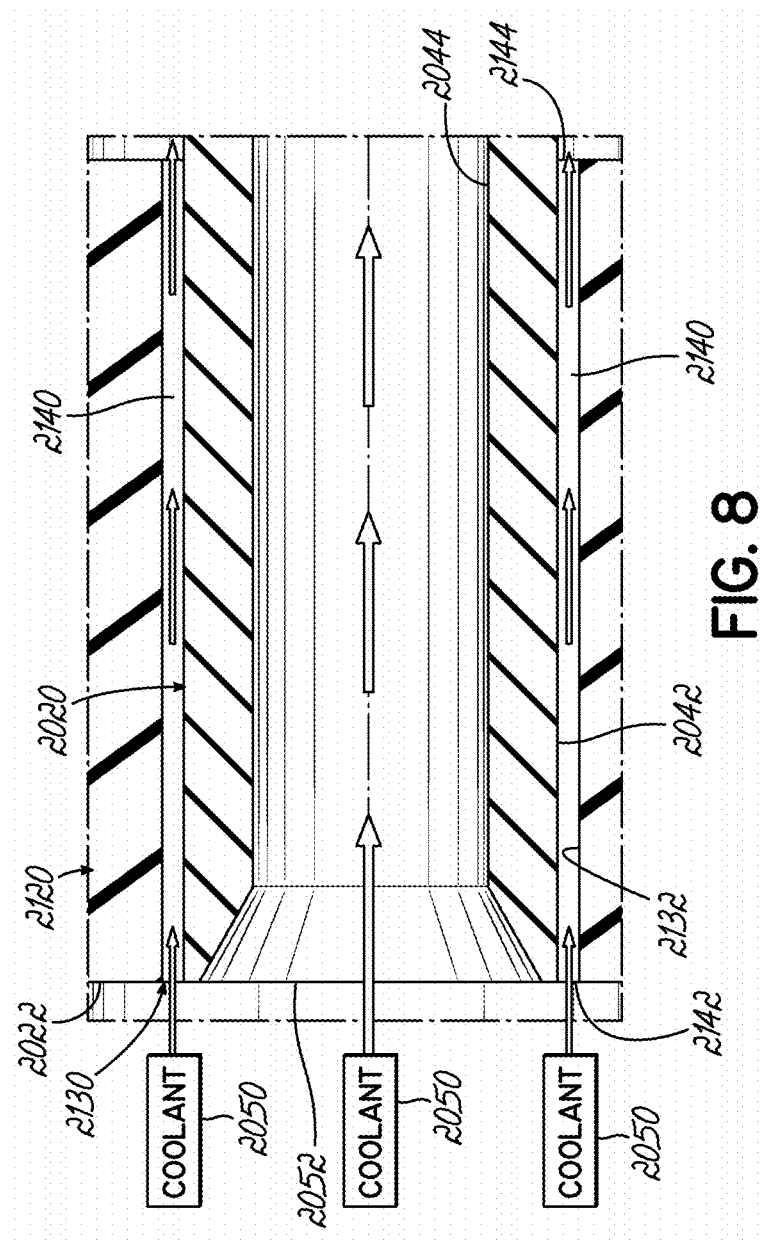
FIG. 8 is a magnified view of a portion of the fluid union shown in FIG. 7, based on detail area 8.

Referring now to FIGS. 7 and 8, wherein like numerals represent like features, an exemplary fluid union 2010 for transferring a pressurized fluid from a stationary source 2050 (shown schematically into a rotating spindle shaft is shown in accordance with another embodiment of the present invention. The primary differences between the fluid union 2010 of this embodiment and the fluid unions 10, 1010 of the embodiments described above with regard to FIGS. 1-6 relate to the primary seal and the secondary seal. As shown, the fluid inlet port 2076 of the first end cap 2070 is located at the periphery of the first end cap 2070 for receiving pressurized fluid from a stationary source in a radial manner. The first end cap 2070 includes a redirecting chamber 2250 for altering the course of the pressurized fluid from a radial direction to an axial direction into the inlet end 2052 of the shaft bore 2044. Thus, the pressurized fluid may enter the shaft bore 2044 in an axial manner despite initially entering the fluid union 2010 in a radial manner.

Similar to the embodiment described above with regard to FIG. 6, the nut 2092 which threadably couples to the rotatable shaft 2020 to retain the inner races 2032 of the ball bearings 2030 fixed relative thereto is flangeless. Thus, the flange 2110 having the abrasive contact surface 2112 for confronting the gasket 2200 is provided on a flinger 2240 which presses on to the rotatable shaft 2020. In the embodiment shown, the flinger 2240 is coupled to the rotatable shaft 2020 via a retaining ring 2252 which seats in an annular pocket 2254 of the rotatable shaft 2020 and clamps the flinger 2240 against a shoulder 2256 of the rotatable shaft 2020. In addition or alternatively, other external fasteners such as screws or adhesive may be used (not shown). As shown, an O-ring 2100 is positioned between the flinger 2240 and the rotatable shaft 2020 to provide a fluid-resistant seal therebetween. In addition, the plug 2204 of the gasket 2200 is held in place between the seal spacer 2090 and the stationary housing 2012, and an O-ring 2202 is positioned between the gasket 2200 and the stationary housing 2012 for providing a fluid-resistant seal therebetween.

As best shown in FIG. 8, the primary seal is provided by a gap 2140 between the rotatable shaft 2020 and a fixed bushing 2120. In the embodiment shown, the fixed bushing 2120 is integrally formed together with the stationary housing 2012 as a unitary piece. Alternatively, the fixed bushing 2120 may be formed as a separate piece, positioned over the rotatable shaft 2020 within the hollow interior 2016 of the stationary housing 2012, and fixed against movement relative to the stationary housing 2012. In any event, the fixed bushing 2120 includes a bushing bore 2130 having an inner surface 2132 spaced apart from the outer surface 2042 of the rotatable shaft 2020 to define the gap 2140 for allowing controlled leakage of a portion of the pressurized fluid flowing from the redirecting chamber 2250 toward the shaft bore 2044.

Various other aspects of the fluid union 2010 are similar to those described above with regard to the previous embodiments and will be readily understood, and thus are not repeated here for the sake of brevity.

Figure 9:
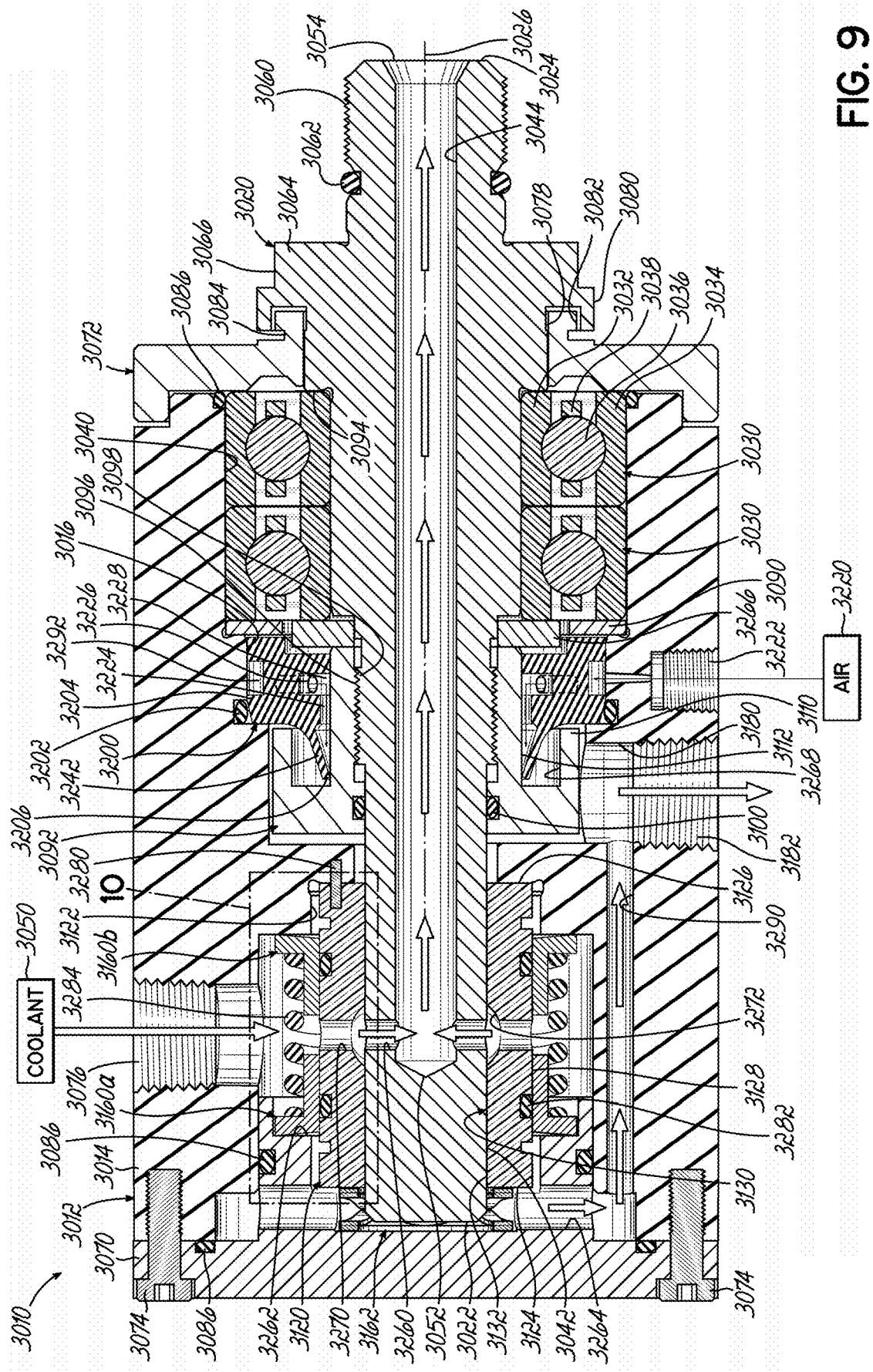
FIG. 9 is a cross sectional view of a fluid union according to a third preferred embodiment of the invention, showing a radially directed supply of pressurized fluid.
Figure 10:
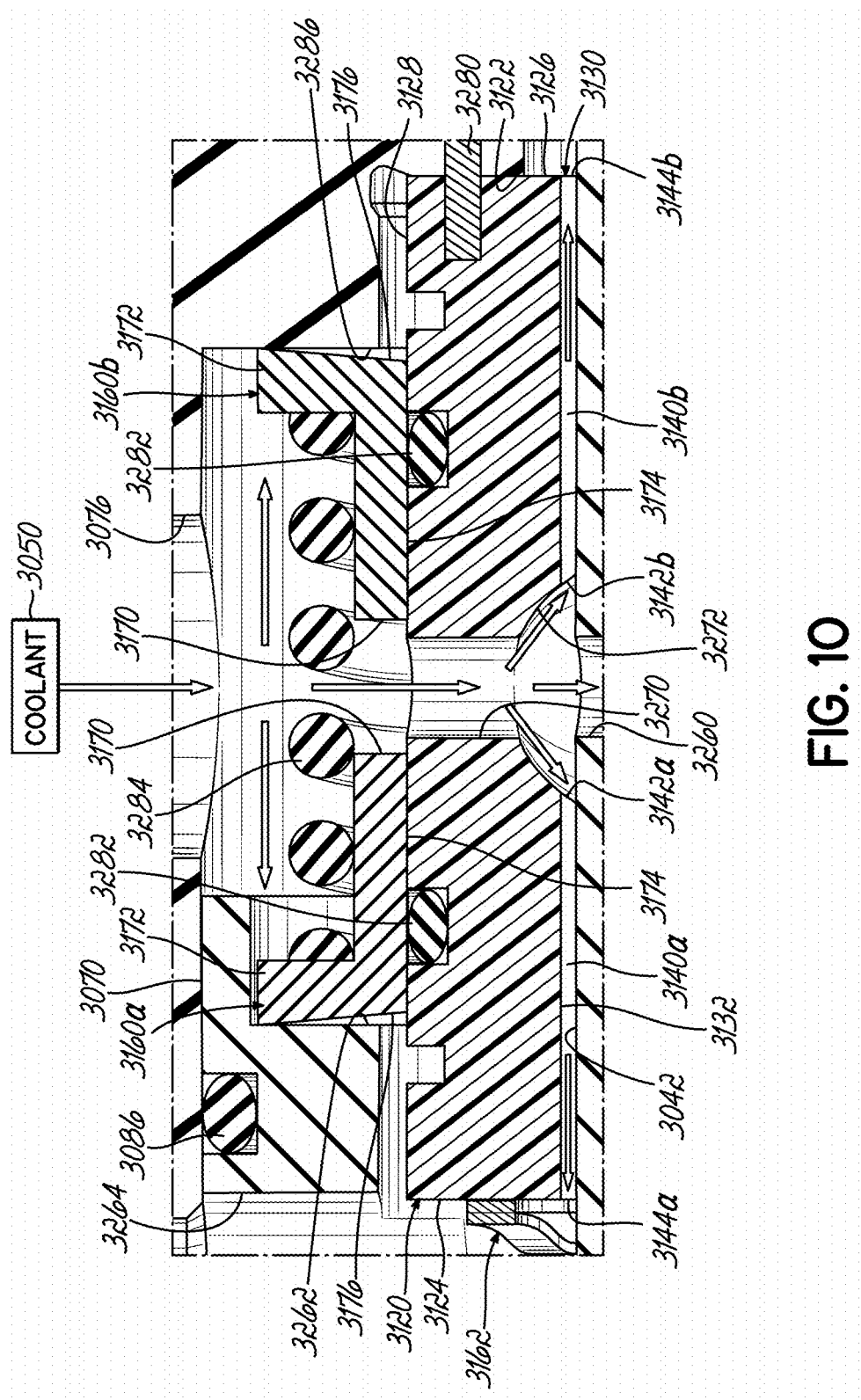
FIG. 10 is a magnified view of a portion of the fluid union shown in FIG. 9, based on detail area 10.

Referring now to FIGS. 9 and 10, wherein like numerals represent like features, an exemplary fluid union 3010 for transferring a pressurized fluid from a stationary source 3050 (shown schematically) into a rotating spindle shaft is shown in accordance with another embodiment of the present invention.

As shown, the fluid union 3010 includes a stationary housing 3012 having a generally cylindrical body 3014 with a hollow interior 3016. A stationary pressurized fluid inlet port 3076 extends radially through the cylindrical body 3014 into the hollow interior 3016 for receiving pressurized fluid such as coolant from the stationary source 3050. A rotatable body in the form of a shaft 3020 having first and second ends 3022, 3024 extends at least partially into the hollow interior 3016 of the stationary housing 3012 and is rotatable relative thereto about a longitudinal axis 3026. In this regard, two ball bearings 3030 are positioned between the stationary housing 3012 and the rotatable shaft 3020 for maintaining alignment therebetween. More particularly, the cylindrical body 3014 defines a bearing chamber 3040 in which the ball bearings 3030 reside. Each ball bearing 3030 includes an inner race 3032, an outer race 3034, a plurality of bearing balls 3036, and a cage or retainer 3038. While two ball bearings 3030 are shown, it will be appreciated that any suitable number and/or type of bearings may be used to maintain alignment between the rotatable shaft 3020 and the stationary housing 3012.

The rotatable shaft 3020 includes an outer surface 3042 and a shaft bore 3044 extending partially along the longitudinal axis 3026 for directing pressurized fluid therethrough. In this regard, the shaft bore 3044 has an inlet end 3052 between the first and second ends 3022, 3024 of the shaft 3020 and an outlet end 3054 at the second end 3024 of the shaft 3020. A plurality of holes 3260 extend radially from the outer surface 3042 to the shaft bore 3044 at or near the inlet end 3052 such that the inlet end 3052 is configured to receive the pressurized fluid from the inlet port 3076 of the stationary housing 3012 in a radial manner. As shown, the outer surface 3042 of the rotatable shaft 3020 includes a threaded portion 3060 proximate the second end 3024 for threadably coupling the rotatable shaft 3020 to the spindle shaft (not shown) for directing the pressurized fluid from the shaft bore 3044 into the rotating spindle shaft. A gasket, such as an O-ring 3062, is positioned over the outer surface 3042 of the rotatable shaft 3020 proximate the second end 3024 for providing a fluid tight seal between the rotatable shaft 3020 and the spindle shaft. In the embodiment shown, the outer surface 3042 of the rotatable shaft 3020 includes a generally hex-shaped portion 3064 proximate the second end 3024 and defining a plurality of flats 3066 to provide gripping points for a tool, such as a wrench, to allow tight threadable coupling of the rotatable shaft 3020 to the spindle shaft. While a threadable coupling is provided by the illustrated embodiment, the rotatable shaft 3020 may be coupled to the spindle shaft in any suitable manner. In one embodiment, the rotatable shaft 3020 and the spindle shaft may be integrally formed together as a unitary piece.

In the embodiment shown, the stationary housing 3012 includes first and second end caps 3070, 3072 removably coupled to the generally cylindrical body 3014 at opposite ends thereof via fasteners, such as bolts or screws 3074. The first end cap 3070 includes an inner shoulder 3262 and, together with the cylindrical body 3014, defines a first drainage passageway 3264, the purposes of which are described below. The second end cap 3072 retains the outer races 3034 of the ball bearings 3030 in the bearing chamber 3040 and has a bore 3078 through which the second end 3024 of the shaft 3020 extends for coupling to the spindle shaft. In the embodiment shown, the rotatable shaft 3020 includes a flange 3080 which envelopes a portion of the second end cap 3072 to form a labyrinth 3082 for inhibiting external contaminants from entering the fluid union 3010. The second end cap 3072 includes an annular groove 3084 at or near the interface with the rotatable shaft 3020 for redirecting contaminants out of and away from the labyrinth 3082. Gaskets, such as O-rings 3086, are positioned between the generally cylindrical body 3014 and the end caps 3070, 3072 for providing a fluid tight seal therebetween.

In the embodiment shown, a seal spacer 3090 is positioned within the hollow interior 3016 of the stationary housing 3012 and is held in place by the force thereon by the second end cap 3072 via the outer races 3034 of the ball bearings 3030. The purpose of the seal spacer 3090 is described in greater detail below.

A nut 3092 is threadably coupled to the rotatable shaft 3020 within the hollow interior 3016 of the stationary housing 3012 and retains the inner races 3032 of the ball bearings 3030 relative to the rotatable shaft 3020 via a shaft spacer 3266 by clamping the inner races 3032 against a shoulder 3094 of the rotatable shaft 3020. In this regard, the nut 3092 includes a threaded surface 3096 and the outer surface 3042 of the rotatable shaft 3020 includes a corresponding threaded portion 3098 for engaging the threaded surface 3096 of the nut 3092. Thus, the nut 3092, the shaft spacer 3266, and the inner races 3032 of the ball bearings 3030 are rotatable together with the rotatable shaft 3020 with respect to the stationary housing 3012. A gasket, such as an O-ring 3100, is positioned between the nut 3092 and the outer surface 3042 of the rotatable shaft 3020 for providing a fluid tight seal therebetween. The nut 3092 includes an outer abrasive surface, such as a striated surface 3112, and a flange 3110 extending outwardly from the outer abrasive surface 3112 and defining a labyrinth 3268, the purposes of which are described below.

The illustrated embodiment includes a floating bushing 3120 positioned over the rotatable shaft 3020 within the hollow interior 3016 of the stationary housing 3012 and, more particularly, in a bushing chamber 3122 defined by the first end cap 3070 and the cylindrical body 3014. The floating bushing 3120 includes first and second end surfaces 3124, 3126, an outer surface 3128 and a bushing bore 3130 having an inner surface 3132. The floating bushing 3120 further includes a plurality of bore inlets 3270 extending between the inner and outer surfaces 3128, 3132 approximately at a midpoint along the floating bushing 3120 for alignment with the inlet port 3076 of the stationary housing 3012 and the radial holes 3260 of the rotatable shaft 3020 for directing the pressurized fluid therethrough. As shown, the floating bushing 3120 also includes a generally annular groove 3272 between the bushing bore 3130 and the plurality of bore inlets 3270 for providing even distribution of pressurized fluid from the bore inlets 3270 into the radial holes 3260 of the rotatable shaft 3020. Thus, the pressurized fluid may flow in a radial manner from the inlet port 3076 of the stationary housing 3012, through the bore inlets 3270, the annular groove 3272, and the radial holes 3260, and into the shaft bore 3044 where the pressurized fluid may be redirected to flow in an axial manner through the shaft bore 3044 and out of the outlet end 3054 into the spindle shaft.

As best shown in FIG. 10, the inner surface 3132 of the floating bushing 3120 is spaced apart from the outer surface 3042 of the rotatable shaft 3020 by first and second longitudinal gaps 3140a, 3140b, extending on opposite sides of the annular groove 3272 between first and second gap inlets and outlets 3142a, 3142b, 3144a, 3144b, respectively, for allowing controlled leakage of a portion of the pressurized fluid flowing from the bore inlets 3270 toward the radial holes 3260. In this manner, the first and second gaps 3140a, 3140b may provide the primary seal of the fluid union 3010.

In the embodiment shown, the first and second gap inlets 3142a, 3142b are provided at the peripheries of the annular groove 3272, and the first and second gap outlets 3144a, 3144b are provided at the first and second end surfaces 3124, 3126 of the floating bushing 3120. In operation, pressurized fluid 3150 may leak from the annular groove 3272 into the first and second gap inlets 3142a, 3142b and flow through the respective gaps 3140a, 3140b to the respective gap outlets 3144a, 3144b at the end surfaces 3124, 3126 of the floating bushing 3120. In this manner, the pressure of the pressurized fluid may avoid inducing a piston load on the floating bushing 3120 and/or the rotatable shaft 3020. The pressure drop at the first gap outlet 3144a may be substantially the same as the pressure drop at the second gap outlet 3144b, such that axial pressure forces are cancelled out and/or retained within the structure of the floating bushing 3120. This may result in increased bearing life and/or rotational speed capability. In this regard, life of bearings 3030 is dependent upon several variables with the combination of rotating speed and piston load being primary factors. Generally, the faster bearings 3030 rotate the shorter the lifespan and the lower the load capacity for a desired lifespan. Alternately, the higher the load on bearings 3030 the shorter the lifespan and the lower the speed capacity for a desired lifespan. Therefore eliminating substantial piston load on bearings 3030 allows for much higher speed capability and provides for a larger bore diameter 3130 of floating bushing 3120 and larger outer surface 3042 of rotatable shaft 3020. A larger bore diameter 3130 and outer surface 3042 has more space for larger fluid passages 3270, 3272, 3260, and larger shaft bore 3044, which increases flow capacity of fluid in the union 3010. In one embodiment with pressure of fluid at 1,000 psi the calculated bearing speed capacity can be increased from 20,000 rpm to 45,500 rpm.

In the embodiment shown, a spring such as a wave spring 3162 is positioned between the first end cap 3070 and the first end surface 3124 of the floating bushing 3120 for biasing the floating bushing 3120 toward the second end 3024 of the rotatable shaft 3020 such that the second end surface 3126 of the floating bushing 3120 abuts an inner wall of the bushing chamber 3122. The biasing of the floating bushing 3120 by the wave spring 3162 may be relatively light in order to allow the floating bushing 3120 to float and thereby maintain alignment with the rotatable shaft 3020 in the event that the fluid union 3010 is bumped or pulled upon. Together, the first end cap 3070, wave spring 3162, and inner wall of the bushing chamber 3122 retain the floating bushing 3120 within the bushing chamber 3122. The interface between the wave spring 3162 and the floating bushing 3120 and interface between floating bushing 3120 and inner wall of bushing chamber 3122 may allow sliding motion therebetween to control the radial positioning of the bushing 3120 relative to the longitudinal axis 3026, such that the floating bushing 3120 may be permitted to radially self-align in response to initial radial misalignment or slight movement of the rotatable shaft 3020, for example. In the embodiment shown, an anti-rotation pin 3280 is positioned in operative contact with each of the floating bushing 3120 and a portion of the stationary housing 3012, such as the cylindrical body 3014, for inhibiting rotation of the floating bushing 3120 about the longitudinal axis 3026.

In the embodiment shown, there may be little or no fluid pressure forcing the floating bushing 3120 toward or away from the inner walls of the bushing chamber 3122. Thus, the interface between the second end surface 3126 of the floating bushing 3120 and the inner wall of the bushing chamber 3122 against which it rests may not be required to be flush for proper angular alignment of the floating bushing 3120 relative to the longitudinal axis 3026. In one embodiment, a washer (not shown) similar to that described above with respect to the embodiment shown in FIGS. 1-5A may be positioned between the second end surface 3126 of the floating bushing 3120 and the wall of the bushing chamber 3122 for providing improved angular self-alignment of the floating bushing 3120. For example, the housing 3012 could contain a socket similar to socket 154 of fluid union 10, and a washer of similar shape and configuration as washer 150 of fluid union 10 could provide similar angular alignment capabilities for floating bushing 3120 that washer 150 provides for floating bushing 120.

As shown, first and second bushing seals 3160a, 3160b are positioned between the outer surface 3128 of the floating bushing 3120 and the stationary housing 3012 on opposite sides of the bore inlets 3270 for providing a fluid-resistant seal therebetween. Gaskets, such as O-rings 3282, are positioned between the floating bushing 3120 and the first and second bushing seals 3160a, 3160b. The first and second bushing seals 3160a, 3160b may be capable of sliding axially over the floating bushing 3120 and O-rings 3282 in order to self-adjust. To that end, a compression spring 3284 is positioned between the first and second bushing seals 3160a, 3160b for biasing the first and second bushing seals 3160a, 3160b away from each other and against opposing inner surfaces of the stationary housing 3012. In the embodiment shown, the first bushing seal 3160a is biased against the shoulder 3262 of the first end cap 3070, and the second bushing seal 3160b is biased against a shoulder 3286 of the cylindrical body 3014 of the stationary housing 3012.

In the embodiment shown, the bushing seals 3160a, 3160b each have an angled L-shaped cross section. More particularly, the bushing seals 3160a, 3160b each include first and second transverse legs 3170, 3172. The first leg 3170 includes a substantially level outer surface 3174 and the second leg 3172 includes an angled end surface 3176 which tapers inwardly toward the first leg 3170. When pressurized fluid is present in the bushing chamber 3122, the bushing seals 3160a, 3160b may flex such that the end surfaces 3176 conform to the respective inner surfaces of the stationary housing 3012, including surface defects thereof, in order to provide fluid-resistant seals therebetween. In addition or alternatively, the bushing seals 3160a, 3160b and/or compression spring 3284 may assist in retaining the floating bushing 3120 in alignment with the rotatable shaft 3020 while allowing the floating bushing 3120 to float. Other suitable configurations of the bushing seals 3160a, 3160b may be used, such as those having a more perpendicular L-shaped cross section.

A collection cavity 3180 is provided in the hollow interior 3016 downstream of the gap outlets 3144a, 3144b for collecting leaked pressurized fluid 3050. A second drainage passageway 3290 extends between the first drainage passageway 3264 and the collection cavity 3180. The collection cavity 3180 may depressurize the leaked pressurized fluid exiting the first and second gap outlets 3144a, 3144b and direct the fluid 3050 into one or more drains 3182 extending through the cylindrical body 3014 of the stationary housing 3012 for evacuating the leaked fluid from the fluid union 3010. In the embodiment shown, the drain 3182 is threaded such that a hose (not shown) may be threadably attached to the drain 3182 to direct the leaked fluid into a tank or other desired area.

In the embodiment shown, leaked fluid flowing through the second gap 3140b may flow substantially directly from the second gap outlet 3144b into the collection cavity 3180. Leaked fluid flowing through the first gap 3140a may flow from the first gap outlet 3144a into the first and second drainage passageways 3264, 3290 and into the collection cavity 3180. In other embodiments, there may be a circular pattern of more than one set of first and second drainage passageways 3264, 3290 about the longitudinal axis 3026.

The illustrated embodiment includes a gasket 3200 positioned between the stationary housing 3012 and the outer surface 3042 of the rotatable shaft 3020 downstream of the gap outlets 3144a, 3144b. An O-ring 3202 is positioned between the gasket 3200 and the stationary housing 3012 for providing a fluid-resistant seal therebetween. The gasket 3200 includes a plug 3204 and a flexible lip 3206 for forming a fluid-resistant seal with the outer surface 3112 of the nut 3092 and thereby prevent leaked fluid from escaping the collection cavity 3180 into components of the fluid union 3010, such as the ball bearings 3030. In this manner, the gasket 3200 may provide the secondary seal of the fluid union 3010.

In one embodiment, the gasket 3200 may be constructed of a relatively flexible material, such as a chemically resistant elastomer with a low coefficient of friction. For example, the lip 3206 of the gasket 3200 may be at least partially constructed of polytetrafluoroethylene. The gasket 3200 may be held in place with respect to the stationary housing 3012 by an interference fit and/or by external fasteners such as screws or adhesive (not shown). In any event, at least a portion of the lip 3206 of the gasket 3200 rests against the abrasive outer surface 3112 of the nut 3092. As the nut 3092 rotates with the rotatable shaft 3020, the lip 3206 of the gasket 3200 wears and is at least partially abraded by the abrasive outer surface 3112, such that the abraded portion is deposited on the abrasive surface 3112 to provide smooth, low-friction contact between the nut 3092 and the lip 3206. In this manner, the rotatable shaft 3020 may be operated at high speeds, such as 24,000 rpm, without generating undesirable heat at the interface between the lip 3206 and the nut 3092 or otherwise compromising performance of the fluid union 3010. By partially abrading the lip 3206 and depositing the abraded portion on the abrasive surface 3112 to provide the smooth, low-friction contact, tolerance stack-ups resulting from imprecisions in manufacturing and/or assembly of the fluid union 3010 may be overcome while achieving fluid-resistant contact between the lip 3206 and the nut 3092. In this regard, the contact force of the nut 3092 against the lip 3206 may slightly deform the lip 3206 such that, as the lip 3206 wears, the lip 3206 continues to be urged into contact with the abrasive surface 3112 of the nut 3092.

In the embodiment shown, the flexible lip 3206 has a generally inverted V-shaped cross section. More particularly, the flexible lip 3206 includes a generally frustoconical portion 3242 extending inwardly from an inner portion of the plug 3204 toward the outer abrasive surface 3112 and configured to be at least partially abraded thereby in a manner similar to the lips 206, 1206, 2206 of the previous embodiments.

In one embodiment, the fluid union 3010 may include a gas purge system configured to provide pressurized gas, such as air 3220, to the stationary housing 3012 for directing the leaked fluid toward the at least one drain 3182 and/or away from the lip 3206 of the gasket 3200. The gas purge system may be similar to those described in U.S. Pat. Nos. 5,727,095, 5,980,115, 6,217,219, and/or 7,090,220, the contents of which are incorporated herein in their entireties.

In the embodiment shown, the cylindrical body 3014 includes a gas inlet port 3222 extending radially therethrough for directing pressurized gas, such as air 3220, from a gas source (not shown) into the hollow interior 3016. In this regard, the gas inlet port 3222 may be threaded for threadably coupling to a hose (not shown). As shown, the plug 3204 of the gasket 3200 is spaced apart from the nut 3092 by a gas purge gap 3224. The gasket 3200 defines one or more tangential ducts 3226 for receiving pressurized air 3220 from the gas inlet port 3222 via an outer annular pocket 3292 defined by the gasket 3200 and redirecting the pressurized air 3220 to flow tangentially into an inner annular pocket 3228 defined by the gasket 3200 and subsequently into the gas purge gap 3224. More particularly, the ducts 3226 may be tangential to a circle that is concentric with the rotatable shaft 3020. The pressurized air 3220 may circulate within the inner annular pocket 3228 to create a substantially uniform pressure distribution therein and travel through the gas purge gap 3224 toward the lip 3206 of the gasket 3200. The pressurized air may deflect at the lip 3206 away from the abrasive contact surface 3112 and repel the leaked fluid 3050 away therefrom in a manner similar to that described above with respect to the embodiment shown in FIGS. 1-5B. In this manner, the pressurized air 3220 may contribute to providing the secondary seal for preventing internal contamination of components of the fluid union 3010, such as the ball bearings 3030, and may allow the secondary seal to operate in a substantially frictionless state. This may enable higher rotational speed of the rotatable shaft 3020 and/or longer life of the gasket 3200.

As shown, the lip 3206 of the gasket 3200 extends into the labyrinth 3268 of the nut 3092 to assist in maintaining the interface between the lip 3206 and the abrasive surface 3112 above the level of leaked fluid in the collection cavity 3180, regardless of the mounting orientation of the fluid union 3010. This may reduce the possibility of leaked fluid breaching the interface between the lip 3206 and the abrasive surface 3112. It will be appreciated that the pressurized air 3220 may further enhance the sealing ability of the secondary seal.

In one embodiment, the portion of the plug 3204 adjacent the ball bearings 3030 may be spaced apart from the nut 3092 by a gas escape gap (not shown). A portion of the pressurized air 3220 may exit the inner annular pocket 3228 via the gas escape gap and flow through the ball bearings 3030, between the second end cap 3072 and rotatable shaft 3020, and out of the fluid union 3010. It will be appreciated that the size of the gas escape gap and/or the spacing between the second end cap 3072 and rotatable shaft 3020 may restrict the amount of air flow through the ball bearings 3030. The resulting internal pressure within the bearing chamber 3040 may assist in preventing external contaminants from entering the fluid union 3010 through the labyrinth 3082 between the second end cap 3072 and the rotatable shaft 3020. In one embodiment, the labyrinth 3082 may be replaced with a gasket having a flexible lip similar to the gasket 3200 of the secondary seal for improved prevention of external contamination.

Other suitable configurations of the gasket 3200, nut 3092, and/or abrasive surface 3112 may be used, such as those described above with respect to the embodiments shown in FIGS. 1-8.

Figure 11:
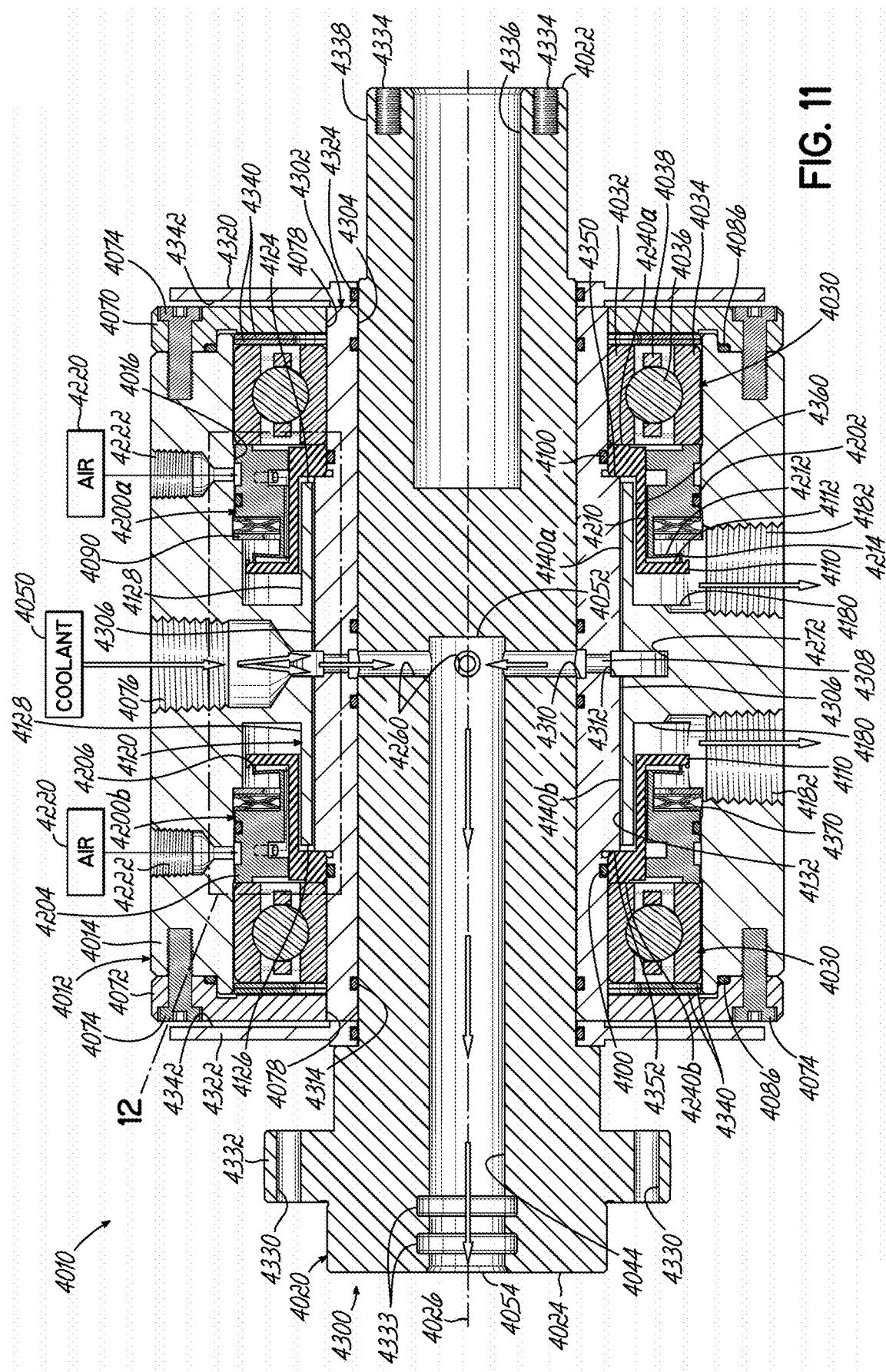
FIG. 11 is a cross sectional view of a portion of a fluid union according to a fourth embodiment of the invention, again showing a radially directed supply of pressurized fluid, generally near the middle of the fluid union housing.
Figure 12:
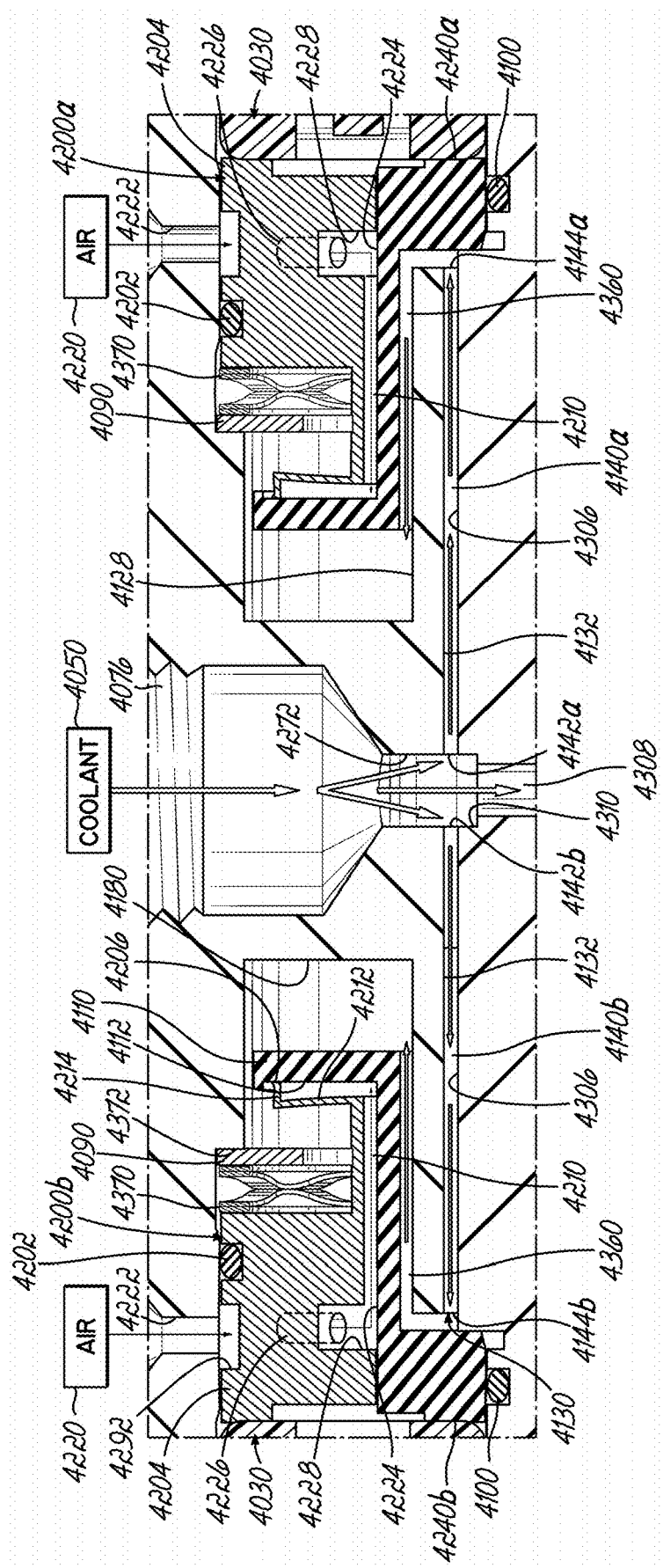
FIG. 12 is a magnified view of a portion of the fluid union shown in FIG. 11, based on detail area 12.

Referring now to FIGS. 11 and 12, wherein like numerals represent like features, an exemplary fluid union 4010 for transferring a pressurized fluid from a stationary source into a rotating spindle shaft is shown in accordance with another embodiment of the present invention.

As shown, the fluid union 4010 includes a stationary housing 4012 having a generally cylindrical body 4014 with a hollow interior 4016. A stationary pressurized fluid inlet port 4076 extends radially through the cylindrical body 4014 into the hollow interior 4016 for receiving pressurized fluid from a stationary source 4050 (shown schematically). A rotatable body 4300 including a shaft 4020 having first and second ends 4022, 4024 extends through the hollow interior 4016 of the stationary housing 4012 and is rotatable relative thereto about a longitudinal axis 4026. In this regard, two ball bearings 4030 are positioned between the stationary housing 4012 and the rotatable body 4300 proximal to the first and second ends 4022, 4024 of the shaft 4020, respectively, for maintaining alignment between the rotatable body 4300 and the stationary housing 4012. Each ball bearing 4030 includes an inner race 4032, an outer race 4034, a plurality of bearing balls 4036, and a cage or retainer 4038. While two ball bearings 4030 are shown, it will be appreciated that any suitable number and/or type of bearings may be used to maintain alignment between the rotatable body 4300 and the stationary housing 4012.

In the embodiment shown, the rotatable body 4300 includes a sleeve 4302 having a sleeve bore 4304 and an outer surface 4306. The sleeve 4302 is positioned over the rotatable shaft 4020 such that the sleeve 4302 is between the rotatable shaft 4020 and the stationary housing 4012, and is fixed relative to the rotatable shaft 4020 via an interference fit. Alternatively, the sleeve 4302 may be fixed relative to the rotatable shaft 4020 via a key, pin, and/or fasteners (not shown). A plurality of holes 4308 extend radially through the sleeve 4302 to the sleeve bore 4304 approximately at a midpoint along the sleeve 4302 for alignment with the inlet port 4076 of the stationary housing 4012. As shown, the sleeve 4302 also includes generally annular inner and outer grooves 4310, 4312 arranged along the plurality of holes 4308 for providing even distribution of pressurized fluid passing therethrough. Gaskets, such as O-rings 4314, are positioned between the rotatable shaft 4020 and the sleeve 4302 for providing a fluid tight seal therebetween. In the embodiment shown, the rotatable body 4300 also includes first and second annular guard plates 4320, 4322 adjacent opposite ends of the sleeve 4302 and fixed relative to the rotatable shaft 4020 via interference fits. Gaskets, such as O-rings 4324, are positioned between the rotatable shaft 4020 and the annular guard plates 4320, 4322 for providing a fluid tight seal therebetween.

The rotatable shaft 4020 includes a shaft bore 4044 extending partially along the longitudinal axis 4026 for directing pressurized fluid therethrough. In this regard, the shaft bore 4044 has an inlet end 4052 between the first and second ends 4022, 4024 of the shaft 4020 and an outlet end 4054 at the second end 4024 of the shaft 4020. A plurality of holes 4260 extend radially through the rotatable shaft 4020 to the shaft bore 4044 at or near the inlet end 4052 and are aligned with the plurality of holes 4308 of the sleeve 4302 such that the inlet end 4052 is configured to receive the pressurized fluid from the inlet port 4076 of the stationary housing 4012 in a radial manner. As shown, the rotatable shaft 4020 includes two longitudinally extending through bores 4330 on a flange 4332 at or near the second end 4024 for receiving fasteners for coupling the rotatable shaft 4020 to the spindle shaft (not shown) such that the pressurized fluid may be directed from the shaft bore 4044 into the rotating spindle shaft. At least one drive key interfacing flange 4322 may be provided for transmitting torque to the spindle shaft (not shown). Other attachment configurations may be utilized. Internal O-ring grooves 4333 are provided in the shaft bore 4044 for receiving O-rings (not shown) for providing a fluid tight seal with the spindle shaft or a coupling component. In one embodiment, the second end 4024 may be configured to hold a tool or other fixture so that the spindle may be eliminated. In the embodiment shown, the rotatable shaft 4020 also includes a plurality of threaded blind bores 4334 at the first end 4022 for receiving threaded fasteners for coupling the rotatable shaft 4020 to a motor shaft for receiving torque from a motor (not shown) such that the rotatable shaft 4020 may transmit the torque from the motor along the longitudinal axis 4026 to the spindle shaft and/or a tool held thereby. The rotatable shaft 4020 further includes a torque transmission bore 4336 at the first end 4022 for receiving a shaft of the motor and/or motor coupling, and a coupling seat 4338 for receiving a flexible coupling of the motor shaft. It will be appreciated that the rotatable shaft 4020 may be coupled to the spindle shaft and/or motor shaft in any suitable manner(s). In one embodiment, the rotatable shaft 4020 and the spindle shaft may be integrally formed together as a unitary piece.

As shown, the stationary housing 4012 includes first and second end caps 4070, 4072 removably coupled to the generally cylindrical body 4014 at opposite ends thereof via fasteners, such as bolts or screws 4074. The first and second end caps 4072, 4074 retain the outer races 4034 of the ball bearings 4030 in the hollow interior 4016 of the stationary housing 4012 via Belleville disc springs 4340, and have bores 4078 through which the first and second ends 4022, 4024 of the shaft 4020 extend for coupling to the spindle and motor shafts. In the embodiment shown, the first and second annular guard plates 4320, 4322 of the rotatable body 4300 confront portions of the first and second end caps 4070, 4072 to form labyrinths 4342 for inhibiting external contaminants from entering the fluid union 4010. Gaskets, such as O-rings 4086, are positioned between the generally cylindrical body 4014 and the end caps 4070, 4072 for providing a fluid tight seal therebetween.

First and second flingers 4240a, 4240b are pressed onto the rotatable body 4300 between the inner races 4032 of the ball bearings 4030 and first and second shoulders 4350, 4352 of the sleeve 4302, respectively. Each flinger 4240a, 4240b includes a flange 4110 having an abrasive contact surface such as a striated surface 4112. In the embodiment shown, the flingers 4240a, 4240b are coupled to the rotatable shaft 4020 via an interference fit. Thus, the flingers 4240a, 4240b and the inner races 4032 of the ball bearings 4030 are rotatable together with the rotatable shaft 4020 with respect to the stationary housing 4012. In addition or alternatively, external fasteners such as screws or adhesive may be used (not shown). As shown, O-rings 4100 are positioned between the flingers 4240a, 4240b and the sleeve 4302 to provide a fluid-resistant seal therebetween.

The illustrated embodiment includes a fixed bushing 4120 integrally formed together with the stationary housing 4012 as a unitary piece and positioned over the rotatable body 4300. The fixed bushing 4120 includes first and second end surfaces 4124, 4126, a bifurcated outer surface 4128, and a bushing bore 4130 having an inner surface 4132. The fixed bushing 4120 further includes a generally annular groove 4272 approximately at a midpoint along the fixed bushing 4120 for alignment with the inlet port 4076 of the stationary housing 4012 and the radial holes 4260, 4308 of the rotatable body 4300 for directing the pressurized fluid therethrough and for providing even distribution of pressurized fluid into the radial holes 4260, 4308 of the rotatable body 4300. In this manner, the pressurized fluid may flow in a radial manner from the inlet port 4076 of the stationary housing 4012, through the annular groove 4272 of the bushing 4120, the outer annular groove 4312, the holes 4308, the inner annular groove 4310, and the holes 4260 into the shaft bore 4044, where the pressurized fluid may be redirected to flow in an axial manner through the shaft bore 4044 and out of the outlet end 4054 into the spindle shaft.

The inner surface 4132 of the fixed bushing 4120 is spaced apart from the outer surface 4306 of the rotatable body 4300 by first and second longitudinal gaps 4140a, 4140b extending on opposite sides of the annular groove 4272 between first and second gap inlets and outlets 4142a, 4142b, 4144a, 4144b, respectively, for allowing controlled leakage of a portion of the pressurized fluid flowing from the annular groove 4272 toward the holes 4308. In this manner, the first and second gaps 4140a, 4140b may provide the primary seal of the fluid union 4010.

In the embodiment shown, the first and second gap inlets 4142a, 4142b are provided at the peripheries of the annular groove 4272, and the first and second gap outlets 4144a, 4144b are provided at the first and second end surfaces 4124, 4126 of the fixed bushing 4120. In operation, pressurized fluid may leak from the annular groove 4272 into the first and second gap inlets 4142a, 4142b and flow through the respective gaps 4140a, 4140b to the respective gap outlets 4144a, 4144b at the end surfaces 4124, 4126 of the fixed bushing 4120. In this manner, the pressure of the pressurized fluid may avoid inducing a piston load on the fixed bushing 4120 and/or the rotatable shaft 4020. The pressure drop at the first gap outlet 4144a may be substantially the same as the pressure drop at the second gap outlet 4144b, such that axial pressure forces are cancelled out and/or retained within the structure of the fixed bushing 4120. This may result in increased bearing life and/or rotational speed capability.

At least one fluid collection cavity 4180 is provided in the hollow interior 4016 downstream of the first and second gap outlets 4144a, 4144b, respectively, for collecting leaked pressurized fluid. The collection cavities 4180 may direct the leaked pressurized fluid exiting the first and second gap outlets 4144a, 4144b into one or more drains 4182 extending through the cylindrical body 4014 of the stationary housing 4012 for evacuating the leaked fluid from the fluid union 4010. In the embodiment shown, the drains 4182 are threaded to provide threadable coupling to one or more hoses (not shown) to direct the leaked fluid into a tank or other desired area. As shown, the flingers 4240a, 4240b form labyrinths 4360 with the outer surface 4128 of the fixed bushing 4120 to assist in directing leaked fluid toward the drains 4182.

The illustrated embodiment includes first and second gaskets 4200a, 4200b positioned between the stationary housing 4012 and the outer surface 4306 of the rotatable body 4300 downstream of the gap outlets 4144a, 4144b. O-rings 4202 are positioned between the gaskets 4200a, 4200b and the stationary housing 4012 for providing a fluid-resistant seal therebetween. The gaskets 4200a, 4200b each include a plug 4204 and a flexible lip 4206 for forming a fluid-resistant seal with the abrasive surface 4112 of the corresponding flinger 4240a, 4240b and thereby prevent leaked fluid from escaping the at least one collection cavity 4180 into other components of the fluid union, such as the ball bearings 4030. In this manner, the gaskets 4200a, 4200b may provide the secondary seal of the fluid union 4010.

In one embodiment, the gaskets 4200a, 4200b may be constructed of a relatively flexible material, such as a chemically resistant elastomer with a low coefficient of friction. For example, the lip 4206 of each gasket 4200a, 4200b may be at least partially constructed of polytetrafluoroethylene. As shown, the gaskets 4200a, 4200b may be permitted to float along with the outer races 4034 of the ball bearings 4030 with respect to the stationary housing 4012 via wave springs 4370 and corresponding seal spacers 4090 resting against shoulders 4372 of the hollow interior 4016. In this regard, if housing 4012 were to be forced axially in the direction of longitudinal axis 4026, it will cause one set of Belleville disc springs 4340 to compress and the other set of Belleville disc springs 4340 to expand causing the housing 4012 to slide axially over the outer races 4034 of bearings 4030. During this movement, the wave springs 4370 maintain contact between gaskets 4200a, 4200b and their respective outer races 4034 of bearings 4030, preventing overcompression or separation of lip 4206 of either gasket 4200a, 4200b relative to their respective abrasive surface 4112 of flingers 4240a, 4240b. In any event, at least a portion of the lip 4206 of each gasket 4200a, 4200b rests against the abrasive surface 4112 of the corresponding flinger 4240a, 4240b. As the flingers 4240a, 4240b rotate with the rotatable shaft 4020, the lip 4206 of each gasket 4200a, 4200b wears and is at least partially abraded by the abrasive surface 4112, such that the abraded portion is deposited on the abrasive surface 4112 to provide smooth, low-friction contact between the flingers 4240a, 4240b and the lips 4206. In this manner, the rotatable shaft 4020 may be operated at high speeds, such as 5,000 rpm using bearings having an 45 mm inner diameter of inner race 4032, without generating undesirable heat at the interfaces between the lips 4206 and the flingers 4240a, 4240b or otherwise compromising performance of the fluid union 4010. By partially abrading the lips 4206 and depositing the abraded portion on the abrasive surfaces 4112 to provide the smooth, low-friction contact, tolerance stack-ups resulting from imprecisions in manufacturing and/or assembly of the fluid union 4010 may be overcome while achieving fluid-resistant contact between the lips 4206 and the flingers 4240a, 4240b. In this regard, the contact force of the flingers 4240a, 4240b against the lips 4206 may slightly deform the lips 4206 such that, as the lips 4206 wear, the lips 4206 continue to be urged into contact with the abrasive surfaces 4112 of the flingers 4240a, 4240b.

In the embodiment shown, the flexible lips 4206 each have a generally step-shaped cross section. More particularly, the flexible lips 4206 each include a generally cylindrical base portion 4210 extending in a generally axial direction from an inner portion of the plug 4204 toward the corresponding flinger 4240a, 4240b, a generally discoid middle portion 4212 extending generally radially outwardly from the base portion 4210, and a generally cylindrical step portion 4214 extending in a generally axial direction from the middle portion 4212 toward the corresponding flinger 4240a, 4240b and configured to be at least partially abraded thereby in a manner similar to the lips 206, 1206, 2206, 3206 of the previous embodiments.

In one embodiment, the fluid union 4010 may include a gas purge system configured to provide pressurized gas, such as air 4220, to the stationary housing 4012 for directing the leaked fluid toward the at least one drain 4182 and/or away from the lips 4206 of the gaskets 4200a, 4200b. The gas purge system may be similar to those described in U.S. Pat. Nos. 5,727,095, 5,980,115, 6,217,219, and/or 7,090,220, the contents of which are incorporated herein in their entireties.

In the embodiment shown, the cylindrical body 4014 includes gas inlet ports 4222 extending radially therethrough for directing pressurized gas, such as air 4220 from a pressurized gas source (not shown) into the hollow interior 4016. In this regard, the gas inlet ports 4222 may be threaded for threadably coupling to one or more hoses. As shown, the plug 4204 of each gasket 4200a, 4200b is spaced apart from the corresponding flinger 4240a, 4240b by a gas purge gap 4224. Each gasket 4200a, 4200b defines one or more tangential ducts 4226 for receiving pressurized air 4220 from the gas inlet ports 4222 via an outer annular pocket 4292 defined by the gasket 4200a, 4200b and redirecting the pressurized air 4220 to flow tangentially into an inner annular pocket 4228 defined by the gasket 4200a, 4200b and subsequently into the gas purge gap 4224. More particularly, the ducts 4226 may be tangential to a circle that is concentric with the rotatable shaft 4020. The pressurized air 4220 may circulate within the inner annular pockets 4228 to create a substantially uniform pressure distribution therein and travel through the gas purge gaps 4224 toward the lips 4206 of the gaskets 4200a, 4200b. The pressurized air 4220 may deflect the lips 4206 away from the corresponding abrasive contact surfaces 4112 and repel the leaked fluid away therefrom in a manner similar to that described above with respect to the embodiment shown in FIGS. 1-5B. In this manner, the pressurized air 4220 may contribute to providing the secondary seal for preventing internal contamination of components of the fluid union 4010, such as the ball bearings 4030, and may allow the secondary seal to operate in a substantially frictionless state. This may enable higher rotational speed of the rotatable shaft 4020 and/or longer life of the gaskets 4200a, 4200b.

In one embodiment, the portion of each plug 4204 adjacent the corresponding ball bearing 4030 may be spaced apart from the corresponding flinger 4240a, 4240b by a gas escape gap (not shown). A portion of the pressurized air 4220 may exit the inner annular pocket 4228 via the gas escape gap and flow through the adjacent ball bearing 4030, between the corresponding end cap 4070, 4072 and rotatable body 4300, and out of the fluid union 4010. It will be appreciated that the size of the gas escape gap and/or the spacing between the end caps 4070, 4072 and rotatable body 4300 may restrict the amount of air flow through the ball bearings 4030. The resulting internal pressure may assist in preventing external contaminants from entering the fluid union 4010 through the labyrinths 4342 between the end caps 4070, 4072 and the guard plates 4320, 4322. In one embodiment, the labyrinths 4342 may be replaced with gaskets having flexible lips similar to the gaskets 4200a, 4200b of the secondary seal for improved prevention of external contamination.

Although this specification discloses and describes these preferred embodiments in considerable detail, applicant does not intend to restrict or limit the scope of the appended claims to such detail. Those skilled in the art will recognize that the general inventive concept is not limited to the specific details and illustrative examples shown and described, but instead is susceptible to additional advantages and modifications. Moreover, those skilled in the art will recognize that the objects described above are intended to help explain the deficiencies of the prior art, not as a separate set of requirements for any of the following claims.

We claim:

1. An apparatus for conveying a pressurized fluid from a stationary source to an internal bore of a rotatable spindle shaft, while the spindle shaft is rotating, comprising:
   a fluid union housing having first and second ends and an opening extending therebetween along an axis, the opening defined by an internal wall, the first end operatively connected to the stationary source and the second end located proximate the rotatable spindle shaft;
   a fluid union shaft located within the fluid union housing along the axis in alignment with the spindle shaft, and being rotatable relative to the fluid union housing, the fluid union shaft having an axial passage with a first inlet end and a second outlet end, the second outlet end being in fluid communication with the internal bore of the rotatable spindle shaft;

wherein the fluid union housing and the fluid union shaft define an annularly shaped internal cavity residing therebetween, such that when the stationary source supplies pressurized fluid to the first inlet end of the fluid union shaft some of the pressurized fluid flows into a first open end of the internal cavity and continues flowing in an axial direction along the housing;

an internal seal located within the fluid union housing and axially displaced from the first open end of the internal cavity, the internal seal preventing further axial flow of the pressurized fluid along the axis, and including first and second opposing annular surfaces, with a first of the surfaces being an abrasive material and a second of the surfaces being a flexible lip of abradable material, whereby relative rotation of the first and second surfaces causes the abrasive surface to abrade the lip, such that portions of the lip deposit on the abrasive surface and become part thereof, and thereby resulting in an annularly shaped contact region of the like materials and permitting relatively high rotational speed of the fluid union shaft, without generating undue heat buildup; and a discharge port formed in the fluid union housing adjacent the internal seal, the discharge port adapted to permit outflow from the fluid union housing of pressurized fluid that has flowed along the internal cavity.

2. The apparatus of claim 1 and further comprising: a purge fluid flowing from the housing to a back side of the internal seal, thereby to cause the lip to "lift off" from the first surface while also opposing any ingress of pressurized fluid, such that the purge fluid joins the leaked pressurized fluid and eventually exits the housing via the discharge port.

3. The apparatus of claim 1 wherein the lip is part of a gasket that has at least one of the following shapes: step-shaped and V-shaped.

4. The apparatus of claim 1 wherein the lip material comprises polytetrafluoroethylene.

5. The apparatus of claim 1 wherein the stationary source delivers pressurized fluid to the axial passage of the fluid union shaft in one of the two following directions: axially and radially.

6. The apparatus of claim 1 wherein the dimensions of the internal cavity; at the first open end thereof, define a relatively long and narrow annular gap, thereby to limit the rate of flow of pressurized fluid along the axis.

7. The apparatus of claim 6 wherein the means for maintaining further comprises: a bushing located within the housing and circumscribing the first inlet end of the fluid union shaft, the bushing having oppositely directed axial surfaces, with at least one of the axially directed surfaces adapted to co-act with an opposing axial surface within the housing, so as to permit the bushing to "float" relative to the housing, and to thereby maintain the same relative position and/or orientation with respect to the fluid union shaft.

8. The apparatus of claim 7 wherein the means for maintaining further comprises:

a washer located within the housing and positioned over the fluid union shaft, the washer having a first side surface in operative contact with one of the axially directed surfaces of the bushing and a second side surface in operative contact with a non-complementary interior surface of the housing such that the bushing is allowed to move angularly relative to the axis as the second side surface of the washer moves relative to the non-complementary interior surface of the housing in order for the bushing to angularly self-align.

9. The apparatus of claim 8 wherein the means for maintaining further comprises:

a spring-loaded bushing seal located within the housing in operative contact with other of the axially directed surfaces of the bushing for biasing the bushing and the washer in an axial direction toward the internal wall of the housing.

10. The apparatus of claim 9, wherein the bushing is configured to slide radially along a surface of the spring-loaded bushing seal.

11. The apparatus of claim 6 wherein the gap has a width of no more than approximately 0.001 inch and a length of at least approximately 18 mm.

12. The apparatus of claim 7, wherein the bushing is configured to slide radially along the first flat side surface of the washer in order for the bushing to radially self-align.

13. The apparatus of claim 7, further comprising at least one anti-rotation pin in operative contact with the bushing for inhibiting rotation of the bushing about the axis.

14. The apparatus of claim 7, wherein the fluid union shaft is at least partially coated in a carbon coating having a hardness of at least Rc80, and/or wherein the bushing is at least partially constructed of zirconia.

15. The apparatus of claim 1, wherein the fluid union shaft is integrally formed together the rotatable spindle shaft as a unitary piece, and/or wherein the fluid union housing is integrally formed together with the housing of the rotatable spindle shaft as a unitary piece.

16. An apparatus for transferring a pressurized fluid from a stationary source into a rotating spindle shaft, comprising:
a stationary housing;
a rotatable shaft extending at least partially into the stationary housing and defining a longitudinal axis, the rotatable shaft including an outer surface and a bore extending along the longitudinal axis for directing the pressurized fluid therethrough, the bore having an inlet end configured to receive the pressurized fluid from the stationary source and an outlet end configured to direct the pressurized fluid into the rotating spindle shaft;
an abrasive contact surface rotatable with the rotatable shaft; and
a gasket fixed relative to the stationary housing and including a flexible lip for contacting the abrasive contact surface,
wherein the abrasive contact surface is configured to at least partially abrade a portion of the lip when the rotatable shaft rotates such that the abraded portion is deposited on the abrasive contact surface.

17. The apparatus of claim 16, wherein the lip has one of a V-shaped cross section and a step-shaped cross section.

18. The apparatus of claim 16, wherein the lip is at least partially constructed of polytetrafluoroethylene.

19. The apparatus of claim 16, wherein the lip includes a discoid portion and a cylindrical portion configured to be at least partially abraded by the abrasive contact surface, and wherein the cylindrical portion is thicker than the discoid portion.

20. The apparatus of claim 19, wherein the cylindrical portion includes an angled tip for directing fluid away from the abrasive contact surface.

21. The apparatus of claim 16, where the abrasive contact surface is striated.

22. The apparatus of claim 16, further comprising a bushing positioned over the rotatable shaft upstream of the gasket and including a bushing bore having an inner bore surface spaced apart from the outer surface of the rotatable shaft by a gap for allowing controlled leakage of a portion of the pressurized fluid, wherein the gasket is configured to inhibit the leaked portion of the pressurized fluid from passing between the lip of the gasket and the abrasive contact surface.

23. The apparatus of claim 22, wherein the bushing either floats relative to the housing, or is a fixed bushing integrally formed together with the housing as a unitary piece.

24. An apparatus for transferring a pressurized fluid from a stationary source into a rotating spindle shaft, comprising:
a stationary housing including an inlet;
a rotatable body including a rotatable shaft extending at least partially into the stationary housing and defining a longitudinal axis, the rotatable body including an outer surface and a shaft bore extending at least partially along the longitudinal axis for directing the pressurized fluid therethrough, the shaft bore having an outlet end configured to direct the pressurized fluid into the rotating spindle shaft, the rotatable shaft including a plurality of radially extending holes configured to direct the pressurized fluid from the inlet of the stationary housing into the shaft bore;
a bushing positioned over the rotatable body and including a cylindrical bore having an inner bore surface and at least one fluid passageway for alignment with the inlet of the stationary housing and at least one of the plurality of holes for directing the pressurized fluid therethrough, the inner bore surface being spaced apart from the outer surface of the rotatable body by first and second gaps extending between first and second gap inlets and outlets, respectively, for allowing controlled leakage of portions of the pressurized fluid toward the first and second gap outlets.

25. The apparatus of claim 24, wherein the bushing is fixed relative to the stationary housing and is integrally formed together with the stationary housing as a unitary piece.

26. The apparatus of claim 25, further comprising:
an abrasive contact surface rotatable with the rotatable shaft; and
a gasket positioned between the inner surface of the stationary housing and the outer surface of the rotatable shaft, the gasket including a flexible lip for contacting the abrasive contact surface,
wherein the abrasive contact surface is configured to at least partially abrade a portion of the lip when the rotatable shaft rotates such that the abraded portion is deposited on the abrasive contact surface.

27. The apparatus of claim 24, further comprising first and second seals positioned around the bushing and a spring positioned between the first and second seals for biasing the first and second seals away from each other.

* * * * *

UNITED STATES PATENT AND TRADEMARK OFFICE
CERTIFICATE OF CORRECTION

| | |
|---|---|
| PATENT NO. | : 11,536,403 B2 |
| APPLICATION NO. | : 16/472005 |
| DATED | : December 27, 2022 |
| INVENTOR(S) | : Stephen Charles Hoeting et al. |

It is certified that error appears in the above-identified patent and that said Letters Patent is hereby corrected as shown below:

In the Specification

Column 13, Line 6, reads "… 2050 (shown schematically into a rotating spindle shaft is …" and should read --… 2050 (shown schematically) into a rotating spindle shaft is …--.

Column 18, Line approx. 9-12, reads "… The gasket 3200 includes … and thereby prevent leaked fluid from escaping …" and should read --… The gasket 3200 includes … and thereby prevents leaked fluid from escaping …--.

In the Claims

Column 25, Line 46-47, Claim 6, reads "The apparatus of claim 1 wherein the dimensions of the internal cavity; at the first open end thereof, define a …" and should read --The apparatus of claim 1 wherein the dimensions of the internal cavity, at the first open end thereof, define a …--.

Column 26, Line 27-28, Claim 15, reads "The apparatus of claim 1, wherein the fluid union shaft is integrally formed together the rotatable spindle shaft as a …" and should read --The apparatus of claim 1, wherein the fluid union shaft is integrally formed together with the rotatable spindle shaft as a …--.

Signed and Sealed this
Twenty-first Day of March, 2023

*Katherine Kelly Vidal*
*Director of the United States Patent and Trademark Office*